(12) United States Patent
Terada

(10) Patent No.: US 8,367,755 B2
(45) Date of Patent: Feb. 5, 2013

(54) THERMOPLASTIC RESIN COMPOSITION, AND MOLDED PRODUCT AND SHEET COMPRISING THE COMPOSITION

(75) Inventor: Kazunori Terada, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 316 days.

(21) Appl. No.: 12/740,923

(22) PCT Filed: Nov. 6, 2008

(86) PCT No.: PCT/JP2008/070240
§ 371 (c)(1),
(2), (4) Date: Apr. 30, 2010

(87) PCT Pub. No.: WO2009/060917
PCT Pub. Date: May 14, 2009

(65) Prior Publication Data
US 2010/0240813 A1 Sep. 23, 2010

(30) Foreign Application Priority Data

Nov. 9, 2007 (JP) .................................. 2007-292237
Jul. 31, 2008 (JP) .................................. 2008-198291

(51) Int. Cl.
*C08K 5/5313* (2006.01)
*C08F 283/08* (2006.01)

(52) U.S. Cl. ............. 524/133; 524/521; 525/77; 525/93; 525/205; 525/217; 525/132; 525/133; 525/63; 525/390; 525/391; 525/397

(58) Field of Classification Search .................. 524/133, 524/521; 525/63, 77, 93, 205, 217, 133, 525/132, 390, 391, 397
See application file for complete search history.

(56) References Cited

U.S. PATENT DOCUMENTS

| | | | |
|---|---|---|---|
| 2,891,920 | A | 6/1959 | Hyde et al. |
| 3,257,357 | A | 6/1966 | Stamatoff |
| 3,257,358 | A | 6/1966 | Stamatoff |
| 3,294,725 | A | 12/1966 | Findlay et al. |
| 3,306,874 | A | 2/1967 | Hay |
| 3,306,875 | A | 2/1967 | Hay |
| 3,929,930 | A | 12/1975 | Izawa et al. |
| 4,011,200 | A | 3/1977 | Yonemitsu et al. |
| 4,386,174 | A | 5/1983 | Cogswell et al. |
| 4,404,322 | A | 9/1983 | Saito et al. |
| 4,721,227 | A | 1/1988 | Hughes et al. |
| 5,310,831 | A | 5/1994 | Maeda et al. |
| 6,838,497 | B2 * | 1/2005 | Hong et al. .................. 524/117 |
| 2004/0138355 | A1 | 7/2004 | Saito et al. |
| 2005/0137418 | A1 | 6/2005 | Bauer et al. |
| 2005/0234161 | A1 | 10/2005 | Steib et al. |
| 2006/0020064 | A1 | 1/2006 | Bauer et al. |
| 2009/0081462 | A1 | 3/2009 | Miyoshi et al. |

FOREIGN PATENT DOCUMENTS

| | | |
|---|---|---|
| JP | 50-051197 | 5/1975 |
| JP | 52-017880 | 5/1977 |
| JP | 56-115357 | 9/1981 |
| JP | 57-125241 | 8/1982 |
| JP | 61-204251 | 9/1986 |
| JP | 62-100551 | 5/1987 |
| JP | 63-021186 | 1/1988 |
| JP | 63-089561 | 4/1988 |
| JP | 63-152628 | 6/1988 |
| JP | 03-204511 | 9/1991 |
| JP | 7-316419 | 12/1995 |
| JP | 9-100390 | 4/1997 |
| JP | 11-158215 | 6/1999 |
| JP | 2000-248144 | 9/2000 |
| JP | 2000-248145 | 9/2000 |
| JP | 2001/294744 | 10/2001 |
| JP | 2004/051889 | 2/2004 |
| JP | 2004/107511 | 4/2004 |
| JP | 2005-179362 | 7/2005 |
| JP | 2005-240035 | 9/2005 |
| JP | 2005-298776 | 10/2005 |
| JP | 2006-037100 | 2/2006 |
| JP | 2006-37100 | * 2/2006 |
| WO | 99/60040 | 11/1999 |
| WO | 02/059208 | 8/2002 |

OTHER PUBLICATIONS

International Search Report for PCT/JP2008/070240, mailed Jan. 20, 2009.
International Preliminary Report on Patentability, including the Written Opinion (in English) for PCT/JP2008/070240, mailed Jul. 8, 2010.

* cited by examiner

*Primary Examiner* — Robert D. Harlan
(74) *Attorney, Agent, or Firm* — Greenblum & Bernstein, P.L.C.

(57) ABSTRACT

There are provided a thermoplastic resin composition excellent in a balance between fluidity and low outgassing, and a molded product and a sheet including the thermoplastic resin composition.
The thermoplastic resin composition may include from 70 to 99% by mass of (A) a polyphenylene ether, from 1 to 30% by mass of (B) a copolymer including an aromatic vinyl compound and an unsaturated dicarboximide derivative as constituent monomers, and from 0 to 20% by mass of (C) a copolymer including an aromatic vinyl compound and a cyanided vinyl compound as constituent monomers, based on 100% by mass of the total of the (A) component, the (B) component and the (C) component, wherein the (B) component has a weight-average molecular weight of from 70,000 to 250,000.

26 Claims, No Drawings

US 8,367,755 B2

THERMOPLASTIC RESIN COMPOSITION, AND MOLDED PRODUCT AND SHEET COMPRISING THE COMPOSITION

TECHNICAL FIELD

The present invention relates to a thermoplastic resin composition, and a molded product and a sheet comprising the composition.

BACKGROUND ART

Although since polyphenylene ether is excellent in mechanical properties, electric properties and heat resistance and moreover excellent in dimensional stability, it is used in broad applications, but the polyphenylene ether is inferior in processability in single use thereof. Then, blending of polystyrene in order to improve processability is well known. However, a problem of the blending of polystyrene is to reduce heat resistance and chemical resistance.

As a technology for improving the fluidity of polyphenylene ether with the heat resistance maintained, a technology (for example, see Patent Document 1) of blending a liquid crystal polyester is proposed.

As resin compositions excellent in flame retardancy and transparency, a technology (for example, see Patent Documents 2, 3 and 4) of blending a polyphenylene ether with a cage-type silsesquioxane and/or a partially cleaved structure of a cage-type silsesquioxane is proposed.

On the other hand, a technology (for example, see Patent Documents 5 and 6) of blending a polyphenylene ether and a maleimide copolymer is proposed.

Patent Document 1: Japanese Patent Application Laid-Open Publication No. 56-11537
Patent Document 2: WO 2002-059208
Patent Document 3: Japanese Patent Application Laid-Open Publication No. 2004-51889
Patent Document 4: Japanese Patent Application Laid-Open Publication No. 2004-107511
Patent Document 5: Japanese Patent Application Laid-Open Publication No. 2001-294744
Patent Document 6: Japanese Patent Application Laid-Open Publication No. 62-100551

DISCLOSURE OF THE INVENTION

Problems to be Solved by the Invention

However, the polymer composition in Patent Document 1 has room for improvement in the transparency. The resin compositions in Patent Documents 2 to 6 have room for improvement in the flame retardancy, heat resistance and transparency.

The present invention has been achieved in consideration of the above-mentioned situations, and an object of the present invention is to provide a thermoplastic resin composition suitable for, for example, electric and electronic components, and excellent in a balance between fluidity and low outgassing, and to provide a molded product and a sheet comprising the thermoplastic resin composition.

Means for Solving the Problems

As a result of exhaustive studies to solve the above-mentioned problems, the present inventor has found that a thermoplastic resin composition is useful which comprises a polyphenylene ether, and a copolymer comprising an aromatic vinyl compound and an unsaturated dicarboximide derivative as constituent monomers, wherein the copolymer comprising the aromatic vinyl compound and the unsaturated dicarboximide derivative as constituent monomers has a weight-average molecular weight in a specific range. This finding has led to the completion of the present invention.

That is, the present invention provides a thermoplastic resin composition, and a molded product and a sheet comprising the thermoplastic resin composition, as described below.

[1]
A thermoplastic resin composition comprising:
(A) a polyphenylene ether;
(B) a copolymer comprising an aromatic vinyl compound and an unsaturated dicarboximide derivative as constituent monomers; and
(C) a copolymer comprising an aromatic vinyl compound and a cyanided vinyl compound as constituent monomers,
wherein the thermoplastic resin composition contains from 70 to 99% by mass of the (A) component, from 1 to 30% by mass of the (B) component and from 0 to 20% by mass of the (C) component, based on 100% by mass of the total of the (A), (B) and (C) components, and
wherein the (B) component has a weight-average molecular weight of from 70,000 to 250,000.

[2]
The thermoplastic resin composition according to [1] described above, wherein the (B) component is an aromatic vinyl-maleimide copolymer.

[3]
The thermoplastic resin composition according to [1] or [2] described above, wherein the (B) component is a copolymer comprising from 40 to 68% by mass of an aromatic vinyl compound, from 32 to 60% by mass of an unsaturated dicarboximide derivative and from 0 to 20% by mass of a copolymerizable vinyl compound.

[4]
The thermoplastic resin composition according to [3] described above, wherein the copolymerizable vinyl compound is a cyanided vinyl compound.

[5]
The thermoplastic resin composition according to any one of [1] to [4] described above, wherein the (B) component and/or the (C) component has a content of a cyanided vinyl compound of from 5 to 30% by mass based on 100% by mass of the total of the (B) component and the (C) component.

[6]
The thermoplastic resin composition according to any one of [1] to [5] described above, wherein the (B) component has a glass transition temperature (as measured by DSC method) of 165° C. or higher.

[7]
The thermoplastic resin composition according to any one of [1] to [6] described above, wherein a mixture of the (B) component and the (C) component has a glass transition temperature (as measured by viscoelastic method) of 125° C. or higher.

[8]
The thermoplastic resin composition according to any one of [1] to [7] described above, further comprising (D) an elastomer.

[9]
The thermoplastic resin composition according to [8] described above, wherein the (D) component is a composite rubber-based graft copolymer obtained by graft polymerizing an aromatic vinyl compound and a cyanided vinyl compound to (D-1) a block copolymer comprising a polymer block containing at least one aromatic vinyl compound as a main component and a polymer block containing at least one conjugated diene compound as a main component, and/or to (D-2) a composite rubber comprising a polyorganosiloxane and a polyalkyl(meth)acrylate.

[10]

The thermoplastic resin composition according to any one of [1] to [9] described above, further comprising (E) a flame retardant.

[11]

The thermoplastic resin composition according to [10] described above, wherein the (E) component is a phosphinate salt.

[12]

The thermoplastic resin composition according to [11] described above, wherein the phosphinate salt has an average particle diameter of from 0.01 to 20 μm.

[13]

A molded product comprising a thermoplastic resin composition according to any one of [1] to [12] described above.

[14]

A sheet comprising a thermoplastic resin composition according to any one of [1] to [12] described above.

Advantages of the Invention

A thermoplastic resin composition of the present invention can provide a thermoplastic resin composition excellent in a balance between fluidity and low outgassing, and a molded product and a sheet comprising the thermoplastic resin composition.

BEST MODE FOR CARRYING OUT THE INVENTION

Hereinafter, the preferred embodiment (hereinafter, referred to as the embodiment) to carry out the present invention will be described in detail. The embodiment is not limited to the following descriptions, and may be variously changed and modified without departing from the gist thereof.

(A Thermoplastic Resin Composition)

The thermoplastic resin composition according to the embodiment is a thermoplastic resin composition comprising:

(A) a polyphenylene ether;

(B) a copolymer comprising an aromatic vinyl compound and an unsaturated dicarboximide derivative as constituent monomers; and (C) a copolymer comprising an aromatic vinyl compound and a cyanided vinyl compound as constituent monomers, wherein the thermoplastic resin composition contains from 70 to 99% by mass of the (A) component, from 1 to 30% by mass of the (B) component and from 0 to 20% by mass of the (C) component, based on 100% by mass of the total of the (A), (B) and (C) components, and wherein the (B) component has a weight-average molecular weight of from 70,000 to 250,000.

Then, each component usable in the embodiment will be described in detail.

(A) A Polyphenylene Ether

In the embodiment, (A) a polyphenylene ether may include a homopolymer and/or a copolymer (hereinafter, simply referred to as "a polyphenylene ether" in some cases) containing a structural unit represented by the formula (1) shown below.

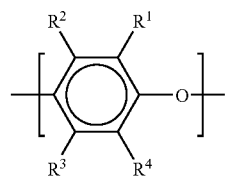

In the formula (1), O represents an oxygen atom; and $R^1$ to $R^4$ each independently represent hydrogen, a halogen, a primary or secondary alkyl group, a phenyl group, a haloalkyl group, an aminoalkyl group, a hydrocarbon oxy group, or a halohydrocarbon oxy group (provided that at least two carbon atoms separate a halogen atom and an oxygen atom).

The halogen in the formula (1) may include a chlorine atom, a bromine atom, an iodine atom, and a fluorine atom.

The alkyl group is not particularly limited as long as it is a primary or secondary alkyl group, but is preferably a lower alkyl group having 1 to 6 carbon atoms, for example, a methyl group, an ethyl group and a propyl group.

The homopolymer of a polyphenylene ether may include, for example, a poly(2,6-dimethyl-1,4-phenylene ether), a poly(2-methyl-6-ethyl-1,4-phenylene ether), a poly(2-methyl-6-n-butyl-1,4-phenylene ether), a poly(2-methyl-6-phenyl-1,4-phenylene ether), a poly(2-methyl-6-chloroethyl-1,4-phenylene ether), a poly(2-methyl-6-hydroxyethyl-1,4-phenylene ether), a poly(2,6-diethyl-1,4-phenylene ether), a poly(2-ethyl-6-isopropyl-1,4-phenylene ether), a poly(2,6-di-n-propyl-1,4-phenylene ether), and a poly(2,6-dichloro-1,4-phenylene ether).

The polyphenylene ether may be used singly or in combination of two or more.

The copolymer of a polyphenylene ether is not particularly limited, and a copolymer of two or more phenol compounds can be used. The kind of phenol compounds is not particularly limited, and can be suitably selected from well-known compounds.

The copolymer of a polyphenylene ether may include, for example, a copolymer of 2,6-dimethylphenol and other phenols. The copolymer of 2,6-dimethylphenol specifically may include a copolymer with 2,3,6-trimethylphenol as disclosed in Japanese Examined Patent Application Publication No. 52-17880, a copolymer with 2-methyl-6-butylphenol and a copolymer with o-cresol.

In the embodiment, the copolymer is not limited to a copolymer of two monomers, and may be a copolymer of three or more monomers. For example, the copolymer may include a copolymer of 2,6-dimethylphenol, 2,3,6-trimethylphenol and o-cresol.

In the case of using a copolymer of 2,6-dimethylphenol and 2,3,6-trimethylphenol as a polyphenylene ether, a copolymer comprising from 60 to 90% by mass of 2,6-dimethylphenol and from 10 to 40% by mass of 2,3,6-trimethylphenol based on 100% by mass of the whole of the copolymer is preferable from the viewpoint of the heat resistance and flame retardancy of a thermoplastic resin composition.

A polyphenylene ether is preferably a copolymer or a mixture of a poly(2,6-dimethyl-1,4-phenylene ether), 2,6-dimethylphenol and 2,3,6-trimethylphenol from the viewpoint of the heat resistance and flame retardancy of a thermoplastic resin composition.

A manufacturing method of a polyphenylene ether is not particularly limited, and can be well-known methods. The manufacturing methods include, for example, those disclosed in U.S. Pat. Nos. 3,306,874, 3,306,875, 3,257,357, 3,257,358, Japanese Patent Application Laid-Open Publication No. 50-51197, Japanese Examined Patent Application Publication No. 52-17880, and Japanese Patent Application Laid-Open Publication No. 63-152628.

The reduced viscosity ($\eta_{sp}/c$: a chloroform solution of 0.5 g/dL, measured at 30° C.) of a polyphenylene ether is preferably in the range of from 0.15 to 0.70 dL/g, more preferably in the range of from 0.20 to 0.60 dL/g, and still more preferably in the range of from 0.40 to 0.55 dL/g, from the viewpoint of the heat resistance and fluidity of a thermoplastic resin composition.

In the embodiment, (A) a polyphenylene ether may be a blend of two or more polyphenylene ethers having different reduced viscosities.

The blend of polyphenylene ethers is not particularly limited, but may include, for example, a mixture of a polyphenylene ether having a reduced viscosity of 0.45 dL/g or lower and a polyphenylene ether having a reduced viscosity of 0.50 dL/g or higher, and a mixture of a polyphenylene ether having a reduced viscosity of 0.40 dL/g or lower and a polyphenylene ether having a reduced viscosity of 0.50 dL/g or higher.

In the embodiment, (A) a polyphenylene ether may be a polyphenylene ether the whole or a part of which has been modified.

The modified polyphenylene ether may include, for example:
(1) a polyphenylene ether modified with a modifying compound having at least one carbon-carbon double or triple bond in the molecular structure and having at least one carboxyl group, one acid anhydride group, one amino group, one hydroxyl group or one glycidyl group; and
(2) a polyphenylene ether modified with an epoxy resin.

A method for manufacturing a modified polyphenylene ether may include:
(1) a method in which a polyphenylene ether is allowed to react with a modifying compound while the polyphenylene ether is not melted in a temperature range equal to or higher than 100° C. and lower than the glass transition temperature thereof in the presence or absence of a radical initiator;
(2) a method in which a polyphenylene ether is melted and kneaded and allowed to react with a modifying compound in a temperature range equal to or higher than the glass transition temperature thereof and equal to or lower than 360° C. in the presence or absence of a radical initiator; and
(3) a method in which a polyphenylene ether is allowed to react with a modifying compound in a solution at a temperature less than the glass transition temperature thereof in the presence or absence of a radical initiator.

In the embodiment, the glass transition temperature of a polyphenylene ether can be measured by differential scanning calorimetry (DSC) according to JIS K-7121.

The modifying compound having a carbon-carbon double bond and a carboxyl group or an acid anhydride group in the molecule may include, for example, unsaturated dicarboxylic acids such as maleic acid, fumaric acid, chloromaleic acid and cis-4-cyclohexene-1,2-dicarboxylic acid, and acid anhydrides thereof.

Among them, preferable are fumaric acid, maleic acid and maleic anhydride, and more preferable are fumaric acid and maleic anhydride.

Compounds in which one or two carboxyl groups of an unsaturated dicarboxylic acid have been converted into an ester(s) can also be used.

The modifying compound having a carbon-carbon double bond and a hydroxyl group in the molecule may include, for example, unsaturated alcohols including alcohols represented by the general formula: $C_nH_{2n-1}OH$, such as allyl alcohol and 4-penten-1-ol; alcohols represented by the general formula: $C_nH_{2n-3}OH$, such as 1,4-pentadien-3-ol; alcohols represented by the general formula: $C_nH_{2n-5}OH$; and alcohols represented by the general formula: $C_nH_{2n-7}OH$ (any n is a positive integer), and the like.

The modifying compound having a carbon-carbon double bond and a glycidyl group in the molecule may include, for example, allyl glycidyl ether, glycidyl acrylate, glycidyl methacrylate and epoxidized natural oils and fats. Among them, preferable are glycidyl acrylate and glycidyl methacrylate.

The epoxy resin may include, for example, butanediol diglycidyl ether, neopentyl glycol diglycidyl ether, trimethylolpropane triglycidyl ether, glycerol triglycidyl ether, triglycidyl isocyanurate, 1,3-diglycidyl hydantoin, bisphenol A-type epoxy resins, cresol novolak-type epoxy resins, ethylene glycol diglycidyl ether diglycidyl aniline and the like. Among them, preferable are bisphenol A-based epoxy resins and cresol novolak epoxy resins.

The modifying compounds described above may be used singly or in combination of two or more.

The addition amount of a modifying compound when a modified polyphenylene ether is manufactured is not particularly limited, but is preferably from 0.1 to 80 parts by mass based on 100 parts by mass of the polyphenylene ether.

The amount of a radical initiator when a modified polyphenylene ether is manufactured using the radical initiator is not particularly limited, but is preferably 0.001 to 1 part by mass based on to 100 parts by mass of the polyphenylene ether.

The addition rate of a modifying compound in a modified polyphenylene ether is preferably from 0.01 to 30% by mass, and more preferably from 0.1 to 20% by mass.

In a modified polyphenylene ether, the unreacted modifying compound, polymers of the modifying compound and the like may be left.

In the embodiment, for the purposes of the stabilization and the like of a polyphenylene ether, various types of well-known stabilizers can suitably be used. The stabilizers may include, for example, organic stabilizers such as hindered phenol stabilizers, phosphorus stabilizers and hindered amine stabilizers. The blend amount of a stabilizer is not particularly limited, but is preferably less than 5 parts by mass based on 100 parts by mass of the polyphenylene ether.

In the embodiment, well-known additives and the like which can be added to a polyphenylene ether may be added in an amount of less than 10 parts by mass based on 100 parts by mass of the polyphenylene ether.

(B) A Copolymer Comprising an Aromatic Vinyl Compound and an Unsaturated Dicarboximide Derivative as Constituent Monomers In the embodiment, (B) a copolymer comprising an aromatic vinyl compound and an unsaturated dicarboximide derivative as constituent monomers (hereinafter, simply referred to as "an aromatic vinyl-unsaturated carboximide copolymer" in some cases) refers to a copolymer obtained by copolymerizing an aromatic vinyl compound and an unsaturated dicarboximide derivative.

The aromatic vinyl compound may include, for example, styrene, α-methylstyrene and vinyltoluene, and is preferably styrene from the viewpoint of the thermal stability of a thermoplastic resin composition. The aromatic vinyl compound may be used singly or as a mixture of two or more.

The unsaturated dicarboximide derivative may include, for example, maleimide derivatives. The maleimide derivatives may include, for example, N-alkylmaleimides such as maleimide, N-methylmaleimide, N-ethylmaleimide, N-propylmaleimide, N-butylmaleimide and N-cyclohexylmaleimide;

and N-arylmaleimides such as N-phenylmaleimide, N-tolylmaleimide, N-xylylmaleimide, N-naphthyl maleimide, N-chlorophenylmaleimide, N-methoxyphenymaleimide and N-bromophenylmaleimide. Among them, preferable is N-phenylmaleimide from the viewpoint of the heat resistance of a thermoplastic resin composition.

The unsaturated dicarboximide derivative may be used singly or as a mixture of two or more.

In the embodiment, the aromatic vinyl-unsaturated carboximide copolymer is preferably an aromatic vinyl-maleimide copolymer from the viewpoint of the heat resistance of a thermoplastic resin composition.

The aromatic vinyl-unsaturated carboximide copolymer according to the embodiment may be copolymerized with another copolymerizable compound other than the aromatic vinyl compound and the unsaturated dicarboximide.

The another copolymerizable compound is not particularly limited, and may include unsaturated dicarboxylic anhydrides, copolymerizable vinyl compounds and the like.

The unsaturated dicarboxylic anhydride may include, for example, anhydrides of maleic acid, itaconic acid, citraconic acid, aconitic acid and the like, and is preferably maleic anhydride from the viewpoint of the control of the degree of polymerization of a copolymer.

The copolymerizable vinyl compound may include, for example, cyanided vinyl compounds such as acrylonitrile and methacrylonitrile; acrylate ester compounds such as methyl acrylate and ethyl acrylate; methacrylate ester compounds such as methyl methacrylate and ethyl methacrylate; vinyl carboxylate compounds such as acrylic acid and methacrylic acid; and compounds such as acrylamide and methacrylamide. Among them, preferable is acrylonitrile from the viewpoint of the transparency of a thermoplastic resin composition.

A method for manufacturing an aromatic vinyl-unsaturated dicarboximide copolymer may include:
(1) a method in which an aromatic vinyl compound, an unsaturated dicarboximide derivative, and as required, a copolymerizable compound are copolymerized; and
(2) a method in which an aromatic vinyl compound, an unsaturated dicarboxylic anhydride, and as required, a copolymerizable compound are copolymerized, and thereafter are allowed to react with ammonia and/or a primary amine to convert an acid anhydride group to an imide group.

Ammonia and the primary amine used in (2) described above may be in either state of being anhydrous or an aqueous solution. The primary amine may include, for example, alkylamines such as methylamine, ethylamine, butylamine and cyclohexylamine; and aromatic amines such as aniline, toluidine, chloroaniline, methoxyaniline and tribromoaniline. Among them, preferable is aniline from the viewpoint of the heat resistance of a thermoplastic resin composition. In the manufacturing method of (2), since that the acid anhydride group remains without being converted to an imide group is no problem, the acid anhydride group can be incorporated in a copolymer.

In the embodiment, usable methods of the copolymerization are well-known ones. In the case of the manufacturing method of (1), the method may include suspension polymerization, emulsion polymerization, solution polymerization and bulk polymerization. In the case of the manufacturing method of (2), the method may include bulk-suspension polymerization, solution polymerization and bulk polymerization.

An aromatic vinyl-unsaturated dicarboximide copolymer to be suitably used may include, for example, styrene/N-phenylmaleimide copolymers, styrene/N-phenylmaleimide/maleic anhydride copolymers and styrene/N-phenylmaleimide/acrylonitrile copolymers, and the like.

The aromatic vinyl-unsaturated dicarboximide copolymer is preferably a copolymer comprising from 40 to 68% by mass of an aromatic vinyl compound, from 32 to 60% by mass of an unsaturated dicarboximide derivative and from 0 to 20% by mass of a copolymerizable compound. More preferably, the copolymer comprises from 40 to 64.99% by mass of an aromatic vinyl compound, from 35 to 59.99% by mass of an unsaturated dicarboximide derivative and from 0.01 to 20% by mass of a copolymerizable compound. Still more preferably, the copolymer comprises from 40 to 64.9% by mass of an aromatic vinyl compound, from 35 to 59.9% by mass of an unsaturated dicarboximide derivative and from 0.1 to 20% by mass of a copolymerizable compound.

The proportion of the aromatic vinyl compound of 40% by mass or higher makes the compatibility with a polyphenylene ether good, and can make a thermoplastic resin composition good in pellet productivity, flame retardancy and impact strength.

The proportion of the unsaturated dicarboximide derivative of 32% by mass or higher can make a thermoplastic resin composition excellent in heat resistance and impact strength.

The proportion of the copolymerizable compound of 20% by mass or lower can make a thermoplastic resin composition excellent in heat resistance and good in thermal stability.

In the embodiment, an aromatic vinyl-unsaturated dicarboximide copolymer has a weight-average molecular weight of from 70,000 to 250,000.

The weight-average molecular weight is 70,000 or higher from the viewpoint of the flame retardancy and outgassing of a thermoplastic resin composition; and that is 250,000 or lower from the viewpoint of the fluidity and flame retardancy of the thermoplastic resin composition. The weight-average molecular weight is more preferably from 100,000 to 250,000, and still more preferably from 100,000 to 200,000.

An aromatic vinyl-unsaturated dicarboximide copolymer may be one aromatic vinyl-unsaturated dicarboximide copolymer, and may be a mixture of a combination of two or more aromatic vinyl-unsaturated dicarboximide polymers wherein the mixture has a weight-average molecular weight of from 70,000 to 250,000.

In the embodiment, the weight-average molecular weight is a molecular weight in terms of polystyrene as a standard sample, and can be calculated from the gel permeation chromatography (GPC) measurement using tetrahydrofuran as a solvent.

In the embodiment, an aromatic vinyl-unsaturated dicarboximide copolymer preferably has a glass transition temperature of 165° C. or higher from the viewpoint of the heat resistance and flame retardancy of a thermoplastic resin composition. That is more preferably 165° C. or higher and 250° C. or lower, and still more preferably 180° C. or higher and 250° C. or lower. Further, the aromatic vinyl-unsaturated dicarboximide copolymer preferably has a glass transition temperature of 250° C. or lower from the viewpoint of the processability of the thermoplastic resin composition.

In the embodiment, the glass transition temperature of an aromatic vinyl-unsaturated dicarboximide copolymer can be measured by the differential scanning calorimetry (DSC) according to JIS K-7121.

(C) A Copolymer Comprising an Aromatic Vinyl Compound and a Cyanided Vinyl Compound as Constituent Monomers In the embodiment, (C) a copolymer (hereinafter, simply referred to as "an aromatic vinyl-cyanided vinyl copolymer" in some cases) comprising an aromatic vinyl compound and a cyanided vinyl compound as constituent monomers refers to a copolymer obtained by copolymerizing an aromatic vinyl compound and a cyanided vinyl compound, and a copolymer excluding (B) a copolymer comprising an aromatic vinyl compound and an unsaturated dicarboximide derivative as constituent monomers.

The aromatic vinyl compound may include, for example, styrene, α-methylstyrene, vinyltoluene and the like, and is preferably styrene from the viewpoint of the thermal stability of a thermoplastic resin composition. The aromatic vinyl compound may be used singly or as a mixture of two or more.

The cyanided vinyl compound may include, for example, acrylonitrile, methacrylonitrile, cyanided vinylidene and the like, and is preferably acrylonitrile from the viewpoint of the transparency of a thermoplastic resin composition. The cyanided vinyl compound may be used singly or as a mixture of two or more.

The aromatic vinyl-cyanided vinyl copolymer may be copolymerized with a copolymerizable compound other than an aromatic vinyl compound, an unsaturated dicarboximide derivative and a cyanided vinyl compound.

The copolymerizable compound may include acrylate ester compounds such as methyl acrylate, ethyl acrylate and butyl acrylate; methacrylate ester compounds such as methyl methacrylate, ethyl methacrylate and butyl methacrylate; vinyl carboxylate compounds such as acrylic acid and methacrylic acid; and compounds such as acrylamide and methacrylamide.

The copolymerizable compound may also be one to which a rubber component such as butadiene or EPDM (ethylene propylene diene rubber) is graft copolymerized.

The aromatic vinyl-cyanided vinyl copolymer to be suitably used may include a styrene-acrylonitrile copolymer (AS resin), a styrene-butadiene-acrylonitrile copolymer (ABS resin) and a styrene-EPDM-acrylonitrile copolymer (AES resin).

Usable methods of polymerization of an aromatic vinyl-cyanided vinyl copolymer are well-known ones, and may include suspension polymerization, emulsion polymerization, solution polymerization and bulk polymerization.

With respect to the copolymerization ratio of an aromatic vinyl compound and a cyanided vinyl compound in an aromatic vinyl-cyanided vinyl copolymer, preferably, the aromatic vinyl compound is from 50 to 95% by mass and the cyanided vinyl compound is from 5 to 50% by mass, from the viewpoint of the transparency of a thermoplastic resin composition. More preferably, the aromatic vinyl compound is from 60 to 80% by mass and the cyanided vinyl compound is from 20 to 40% by mass. Still more preferably, the aromatic vinyl compound is from 62 to 77% by mass and the cyanided vinyl compound is from 23 to 38% by mass.

The blend ratios of (A) a polyphenylene ether, (B) an aromatic vinyl-unsaturated dicarboximide copolymer and (C) an aromatic vinyl-cyanided vinyl copolymer in the thermoplastic resin composition according to the embodiment are: (A) is from 70 to 99% by mass; (B) is from 1 to 30% by mass; and (C) is from 0 to 20% by mass, based on 100% by mass of the total of (A), (B) and (C).

(A) The polyphenylene ether is 70% by mass or more from the viewpoint of the heat resistance, processability and toughness of a thermoplastic resin composition; and it is 99% by mass or less from the viewpoint of the fluidity of the thermoplastic resin composition.

(B) The aromatic vinyl-unsaturated dicarboximide copolymer is 1% by mass or more from the viewpoint of the heat resistance and fluidity of the thermoplastic resin composition; and it is 30% by mass or less from the viewpoint of the toughness of the thermoplastic resin composition.

(C) The aromatic vinyl-cyanided vinyl copolymer is 20% by mass or less from the viewpoint of the flame retardancy of the thermoplastic resin composition.

Preferably, (A) is from 80 to 99% by mass; (B) is from 1 to 20% by mass; and (C) is from 0 to 15% by mass. More preferably, (A) is from 80 to 95% by mass; (B) is from 3 to 15% by mass; and (C) is from 2 to 10% by mass.

The above-mentioned effects are remarkable especially when the weight-average molecular weight of the (B) component is from 70,000 to 250,000.

The content of the cyanided vinyl compound contained in (B) and/or (C) is preferably from 5 to 30% by mass based on 100% by mass of the total of (B) and (C).

That the content of the cyanided vinyl compound is 5% by mass or more and 30% by mass or less can provide a thermoplastic resin composition excellent in transparency, especially haze.

The content is more preferably from 10 to 25% by mass, and still more preferably from 14 to 25% by mass.

In one mode of the thermoplastic resin composition according to the embodiment, and in the case where (C) is 0% by mass, preferably, (B) an aromatic vinyl-unsaturated dicarboximide copolymer is a copolymer comprising an aromatic vinyl compound, an unsaturated dicarboximide derivative and a cyanided vinyl compound, and the content of the cyanided vinyl compound contained in (B) is from 5 to 30% by mass.

In another mode of the thermoplastic resin composition according to the embodiment, and in the case where (C) is more than 0% by mass and 20% by mass or less, (B) an aromatic vinyl-unsaturated dicarboximide copolymer may be a copolymer containing a cyanided vinyl compound, or containing no cyanided vinyl compound.

In the case where (B) is an aromatic vinyl-unsaturated dicarboximide copolymer containing a cyanided vinyl compound, the content of the cyanided vinyl compound contained in (B) and (C) is preferably from 5 to 30% by mass based on 100% by mass of the total of (B) and (C).

In the case where (B) is an aromatic vinyl-unsaturated dicarboximide copolymer contains no cyanided vinyl compound, the content of the cyanided vinyl compound contained in (C) is preferably from 5 to 30% by mass based on 100% by mass of the total of (B) and (C).

In the embodiment, an unsaturated carboximide derivative component contained in (B) is preferably 40% by mass or less based on 100% by mass of the total of (B) and (C) from the viewpoint of the transparency of a thermoplastic resin composition. That is more preferably from 15 to 35% by mass.

In the embodiment, a mixture of (B) and (C) preferably has a glass transition temperature of 125° C. or higher from the viewpoint of the flame retardancy and transparency of a thermoplastic resin composition. That is more preferably 130° C. or higher and 200° C. or lower, still more preferably 130° C. or higher and 180° C. or lower, and further still more preferably 130° C. or higher and 150° C. or lower.

The glass transition temperature is preferably 200° C. or lower from the viewpoint of the processability of a thermoplastic resin composition.

In the embodiment, the glass transition temperature of the mixture of (B) and (C) can be measured from a peak temperature of tan δ using a viscoelasticity analyzer (for example, trade name: RDA-II, manufactured by Rheometrix Corp.).

The thermoplastic resin composition according to the embodiment may further comprise a styrenic polymer such as homopolystyrene and rubber-modified polystyrene (HIPS) from the viewpoint of the weather resistance of a thermoplastic resin composition.

The blend amount of the styrenic polymer is preferably less than 100 parts by mass based on 100 parts by mass of (A) a polyphenylene ether.

(D) An Elastomer

The thermoplastic resin composition according to the embodiment may further comprise (D) an elastomer.

The elastomer may include, for example, a composite rubber-based graft copolymer obtained by graft polymerizing an aromatic vinyl compound and a cyanided vinyl compound to (D-1) a block copolymer comprising a polymer block containing at least one aromatic vinyl compound as a main component and a polymer block containing at least one conjugated diene compound as a main component and/or (D-2) a composite rubber containing a polyorganosiloxane and a polyalkyl(meth)acrylate.

In the block copolymer according to the embodiment comprising a polymer block containing at least one aromatic vinyl compound as a main component and a polymer block containing at least one conjugated diene compound as a main component, "as a main component" in the polymer block containing one aromatic vinyl compound as a main component refers to a block in which the aromatic vinyl compound accounts for at least 50% by mass. The content of the aromatic vinyl compound is more preferably 70% by mass or more, still more preferably 80% by mass or more, and further still more preferably 90% by mass or more.

"As a main component" in the polymer block containing a conjugated diene compound as a main component refers to a block in which the conjugated diene compound accounts for at least 50% by mass. The content of the conjugated diene compound is more preferably 70% by mass or more, still more preferably 80% by mass or more, and further still more preferably 90% by mass or more.

Even the case of a block in which a small amount of a conjugated diene compound or another compound is randomly bonded in an aromatic vinyl compound block is regarded as a block copolymer containing the aromatic vinyl compound as a main component if 50% by mass of the block is formed of the aromatic vinyl compound. The case of the conjugated diene compound is also the same.

The aromatic vinyl compound may include, for example, styrene, α-methylstyrene and vinyltoluene, and is preferably styrene. The aromatic vinyl compound may be used singly or as a mixture of two or more.

The conjugated diene compound may include, for example, butadiene, isoprene and 1,3-pentadiene, and is preferably butadiene, isoprene and a combination thereof. The conjugated diene compound may be used singly or as a mixture of two or more.

The microstructure of the conjugated diene compound block part of a block copolymer has preferably a content of 1,2-vinyl, or a total content of 1,2-vinyl and 3,4-vinyl of from 5 to 80%, more preferably from 10 to 50%, and still more preferably from 15 to 40%.

A block copolymer in the embodiment, if a polymer block containing an aromatic vinyl compound as a main component is represented as [A] and a polymer block containing a conjugated diene compound as a main component is represented as [B], is preferably a block copolymer having a bond form selected from an A-B type, an A-B-A type and an A-B-A-B type, or may be a mixture thereof. Among them, preferable are an A-B type, an A-B-A type and a mixture thereof, and more preferable is an A-B-A type.

A block copolymer of an aromatic vinyl compound and a conjugated diene compound usable in the embodiment is preferably a hydrogenated block copolymer.

The hydrogenated block copolymer refers to one obtained by subjecting a block copolymer of an aromatic vinyl compound and a conjugated diene compound to a hydrogenation treatment to control the aliphatic double bond of a polymer block containing a conjugated diene compound as a main component in the range from more than 0 to 100%. The hydrogenation rate of a hydrogenated block copolymer is preferably 80% or more, and more preferably 98% or more.

The block copolymer may also be used as a mixture of a non-hydrogenated block copolymer and a hydrogenated block copolymer.

The block copolymer of an aromatic vinyl compound and a conjugated diene compound, as long as not contrary to the gist of the embodiment, may be a mixture of block copolymers having different bond forms, containing different aromatic vinyl compound species, containing different conjugated diene compound species, and having different contents of 1,2-bond vinyl or 1,2-bond vinyl and 3,4-bond vinyl, and containing a different content of the aromatic vinyl compound component, and the like.

A block copolymer used in the embodiment may be a block copolymer the whole or a part of which has been modified.

The modified block copolymer used here may include, for example, a block copolymer modified with at least one modifying compound having at least one carbon-carbon double bond or triple bond in the molecular structure and at least one carboxyl group, one acid anhydride group, one amino group, one hydroxyl group or one glycidyl group.

A method for manufacturing a modified block copolymer may include:

(1) a method in which a block copolymer is melted and kneaded with and allowed to react with a modifying compound in a temperature range equal to or higher than the softening point of the block copolymer and equal to or lower than 250° C. in the presence or absence of a radical initiator;

(2) a method in which a block copolymer is allowed to react with a modifying compound in a solution at a temperature equal to or lower than the softening temperature of the block copolymer in the presence or absence of a radical initiator; and (3) a method in which a block copolymer is allowed to react with a modifying compound at a temperature equal to or lower than the softening temperature of the block copolymer while the block copolymer and the modifying compound are not melted in the presence or absence of a radical initiator. Among them, the method of (1) is preferable and in the (1), the method carried out in the presence of a radical initiator is more preferable.

In the embodiment, the at least one modifying compound having at least one carbon-carbon double bond or triple bond in the molecular structure and at least one carboxyl group, one acid anhydride group, one amino group, one hydroxyl group or one glycidyl group, can be the same modifying compound as usable for a modified polyphenylene ether.

In the embodiment, a composite rubber-based graft copolymer obtained by graft polymerizing an aromatic vinyl compound and a cyanided vinyl compound to a composite rubber containing a polyorganosiloxane and a polyalkyl (meth)acrylate is one obtained by graft polymerizing the aromatic alkenyl compound and the cyanided vinyl compound to a composite rubber in which a polyorganosiloxane rubber microparticulately polymerized from an organosiloxane and a crosslinking agent (I), and in certain cases, a graft crossing agent (I), and a polyalkyl(meth)acrylate rubber are mutually entangled.

The organosiloxane may include various types of three- or more membered cyclic ones, and preferably used are three- to six-membered cyclic ones, which may include, for example, hexamethylcyclotrisiloxane, octamethylcyclotetrasiloxane, decamethylcyclopentanesiloxane, dodecamethylcyclohexanesiloxane, trimethyltriphenylcyclotrisiloxane, tetramethyltetraphenylcyclotetrasiloxane and octaphenylcyclotetrasiloxane. These may be used singly or as a mixture of two or more. The use amount thereof is not particularly limited, but is preferably 50% by mass or more, and more preferably 70% by mass or more, in a polyorganosiloxane rubber component.

The crosslinking agent (I) may include three-functional or four-functional silane-based crosslinking agents such as trimethoxymethylsilane, triethoxyphenylsilane, tetramethoxysilane, tetraethoxysilane, tetra-n-propoxysilane and tetrabutoxysilane. Among them, four-functional crosslinking agents are preferable and tetramethoxysilane is especially preferable. The use amount of a crosslinking agent is not especially limited, but is preferably from 0.1 to 30% by mass in a polyorganosiloxane rubber component.

The graft crossing agent (1) may include compounds capable of forming one of units represented by the formula (2) shown below.

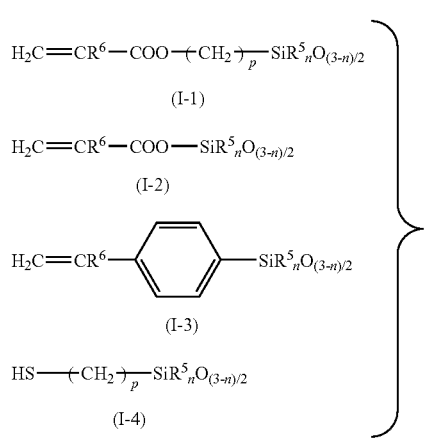

In each formula, $R^5$ represents a methyl group, an ethyl group, a propyl group, or a phenyl group; $R^6$ represents a hydrogen atom or a methyl group; and n is an integer of 0 to 2, and p is an integer of 1 to 6.

Since (meth)acryloyloxysiloxanes capable of forming the unit of the formula (I-1) have a high grafting efficiency, it can form an effective graft chain, thereby developing the impact resistance, which is advantageous.

As a substance capable of forming the unit of the formula (I-1), methacryloyloxysiloxanes are especially preferable. The specific examples of methacryloyloxysiloxanes may include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane and δ-methacryloyloxybutyldiethoxymethylsilane.

The use amount of the graft crossing agent described above is preferably from 0 to 10% by mass in a polyorganosiloxane rubber component.

Manufacture of a latex of a polyorganosiloxane rubber component can use methods described in, for example, U.S. Pat. Nos. 2,891,920 and 3,294,725. In the embodiment, a latex is manufactured preferably, for example, by a method in which a mixed solution of an organosiloxane and a crosslinking agent (I), and as desired, a graft crossing agent (I) is shear mixed with water in the presence of a sulfonic acid emulsifier such as alkylbenzenesulfonic acid and alkylsulfonic acid using a homogenizer or the like.

Alkylbenzenesulfonic acid acts as an emulsifier of organosiloxanes and simultaneously functions as a polymerization initiator, which is suitable. At this time, concurrent use of an alkylbenzenesulfonic acid metal salt, an alkylsulfonic acid metal salt or the like is preferable because a polymer can be stably maintained in graft polymerization.

A polyalkyl(meth)acrylate rubber component constituting the above-mentioned composite rubber can be synthesized using an alkyl(meth)acrylate, a crosslinking agent (II), and a graft crossing agent (II) described below.

The alkyl acrylate may include, for example, methyl acrylate, ethyl acrylate, n-propyl acrylate, n-butyl acrylate, 2-ethylhexyl acrylate and the like. The alkyl methacrylate may include, for example, hexyl methacrylate, 2-ethylhexyl methacrylate, n-lauryl methacrylate and the like. Among them, n-butyl acrylate is especially preferable.

The crosslinking agent (II) may include, for example, ethylene glycol dimethacrylate, propylene glycol dimethacrylate, 1,3-butylene glycol dimethacrylate, 1,4-butylene glycol dimethacrylate and the like.

The graft crossing agent (II) may include, for example, allyl methacrylate, triallyl cyanurate, triallyl isocyanurate and the like. Allyl methacrylate can also be used as a crosslinking agent.

These crosslinking agents and graft crossing agents may be used singly or concurrently in two or more. The use amount of the total of these crosslinking agents and graft crossing agents is not particularly limited, but is preferably from 0.1 to 20% by mass in a polyalkyl(meth)acrylate rubber component.

The polymerization of a polyalkyl(meth)acrylate rubber component can be carried out by adding an alkyl(meth)acrylate, a crosslinking agent and a graft crossing agent described above in a latex of a polyorganosiloxane rubber neutralized by addition of an aqueous solution of an alkali such as sodium hydroxide, potassium hydroxide and sodium carbonate to impregnate the polyorganosiloxane rubber particles with these agents, and thereafter making a common radical initiator act.

Along with the progress of the polymerization reaction, a crosslinked network of a polyalkyl(meth)acrylate rubber mutually entangled with a crosslinked network of a polyorganosiloxane rubber is formed, thus providing a latex of a composite rubber of a polyorganosiloxane rubber component and a polyalkyl(meth)acrylate rubber component, which cannot substantially be separated.

In the embodiment, a composite rubber is preferable which has the main skeleton of the polyorganosiloxane rubber component having a repeating unit of dimethylsiloxane, and the main skeleton of the polyalkyl(meth)acrylate rubber component having a repeating unit of n-butyl acrylate.

The composite rubber thus prepared by the emulsion polymerization can be graft polymerized with a vinylic monomer such as an aromatic alkenyl compound and a cyanided vinyl compound. The gel content of the composite rubber, measured by extracting the composite rubber with toluene at 90° C. for 12 hours, is preferably 80% by mass or more.

The proportions of a polyorganosiloxane rubber component and a polyalkyl(meth)acrylate rubber component in the composite rubber are: preferably, the polyorganosiloxane rubber component is from 3 to 90% by mass and the polyalkyl(meth)acrylate rubber component is from 97 to 10% by mass.

The average particle diameter of the composite rubber is preferably from 0.08 to 0.6 μm.

The vinylic monomer graft polymerizable to the composite rubber may include various types of vinylic monomers including aromatic alkenyl compounds such as styrene, α-methylstyrene, 2,4-dimethylstyrene, monochlorostyrene, p-methylstyrene, p-tert-butylstyrene, ethylstyrene and vinyltoluene; methacrylate esters such as methyl methacrylate and 2-ethylhexyl methacrylate; acrylate esters such as methyl acrylate, ethyl acrylate and butyl acrylate; cyanided vinyl compounds such as acrylonitrile and methacrylonitrile; epoxy group-containing vinyl compounds such as glycidyl methacrylate; and carboxyl group-containing compounds such as methacrylic acid. These may be used singly or in combination of two or more.

In the embodiment, a combination of an aromatic alkenyl compound and a cyanided vinyl compound is preferable, and among them, a combination of styrene and acrylonitrile is especially preferable. The combination of styrene and acrylonitrile exhibits better heat resistance than the case of styrene alone. When the polyphenylene ether resin composition according to the embodiment is manufactured, there is no generation of die drool even under a high process temperature condition and no generation of problems such as strand breakage, which brings about a high manufacture efficiency.

The blend amount of a vinylic monomer is preferably from 5 to 97% by mass based on the amount of a composite rubber which is from 3 to 95% by mass.

A composite rubber-based graft copolymer can be separated and recovered as follows: the vinylic monomer is added to the composite rubber latex described above, and polymerized in one step or in a multistep using the radical polymerization technique to obtain a composite rubber-based graft copolymer latex; and the latex is placed in hot water in which a metal salt of calcium chloride, magnesium sulfate or the like is dissolved, and salted out and coagulated.

As such a composite rubber-based graft copolymer, a conventionally well-known one can be used, and is, for example, a commercially available one, "Metablen (registered trademark) SRK-200", manufactured by Mitsubishi Rayon Co., Ltd.

The blend amount of (D) an elastomer in the embodiment is preferably less than 50 parts by mass based on 100 parts by mass of the total amount of (A), (B) and (C).

(E) A Flame Retardant

The thermoplastic resin composition according to the embodiment may further comprise (E) a flame retardant. The flame retardant may include, for example, silicon compounds, cyclic nitrogen compounds and phosphorus flame retardants.

The silicon compound may include, for example, silicones, cage-type silsesquioxanes or partially cleaved structures thereof, and silica.

The silicone refers to an organosiloxane polymer, and may include ones having a strait chain structure, a crosslinked structure, or a structure constituted of them in a certain proportion. The silicone may be used singly or as a mixture of two or more.

The structure of silicones is preferably a straight chain structure from the viewpoint of the flame retardancy and fluidity of a thermoplastic resin composition. The silicone is preferably one having a functional group at the terminal or the side chain in the molecule from the viewpoint of the flame retardancy and impact resistance of a thermoplastic resin composition. The functional group is preferably an epoxy group, an amino group or the like.

As a silicone, conventionally well-known ones can be used, for example, silicone oils, modified silicone oils and silicone powders manufactured by Dow Corning Toray Co., Ltd.; and straight silicone oils, reactive silicone oils, non-reactive silicone oils and silicone powders, KMP series, manufactured by Shin-Etsu Chemical Co., Ltd. In the embodiment, either of liquid and solid silicones can be used.

The liquid silicone has a viscosity at 25° C. of preferably from 10 to 10,000 (mm$^2$/s), more preferably from 100 to 8,000 (mm$^2$/s), and still more preferably from 500 to 3,000 (mm$^2$/s).

The solid silicone has an average particle diameter of preferably from 0.1 to 100 μm, more preferably from 0.5 to 30 μm, and still more preferably from 0.5 to 5 μm.

The content of a silicon compound is preferably from 0.1 part by mass or more based on 100 parts by mass of the total of (A), (B) and (C) from the viewpoint of the flame retardancy. That is preferably 10 parts by mass or less from the viewpoint of the decrease in rigidity. That is more preferably from 0.3 to 5 parts by mass.

The cyclic nitrogen compound is a cyclic organic compound containing a nitrogen element. The cyclic nitrogen compound is specifically preferably a melamine derivative such as melamine, melem and melon. Among them, melem and melon are more preferable from the viewpoint of the volatility.

The content of a cyclic nitrogen compound is preferably 0.1 part by mass or more based on 100 parts by mass of the total of (A), (B) and (C) from the viewpoint of the flame retardancy. That is preferably 10 parts by mass or less from the viewpoint of the rigidity. That is more preferably from 0.3 to 5 parts by mass.

The phosphorus flame retardant may include, for example, red phosphorus, phosphate ester compounds, phosphite ester compounds, phosphazene compounds and phosphinate salts, and preferable are phosphate compounds and phosphinate salts.

The phosphate ester compounds may include monoorganophosphorus compounds such as triphenyl phosphate and tricresyl phosphate, and organophosphorus compound oligomers, and preferable is organophosphorus compound oligomers.

The organophosphorus compound oligomer is preferably a compound selected from the group of compounds represented by the formula (3) shown below.

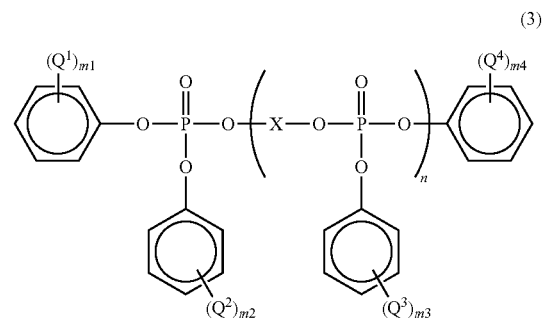

(3)

In the formula, $Q^1$, $Q^2$, $Q^3$ and $Q^4$ each independently represent a $C_1$ to $C_6$ alkyl group or hydrogen; n is an integer of 1 or more, and $m_1$, $m_2$, $m_3$ and $m_4$ represent an integer of 0 to 3; and X is selected from one of the formula (4) shown below.

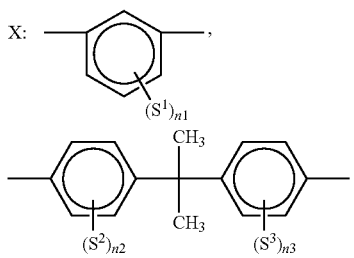

(4)

In the formula, $S^1$, $S^2$ and $S^3$ represent a hydrogen atom or a methyl group; and $n_1$, $n_2$ and $n_3$ represent an integer of 0 to 2.

As an organophosphorus compound oligomer, well-known ones can be used, and may include, for example, CR-741, CR-747, CR-733S and the like, manufactured by Daihachi Chemical Industry Co., Ltd.

The phosphinate salts are preferably at least one type of phosphinate salts selected from the group of a phosphinate salt represented by the formula (5) shown below, a diphosphinate salt represented by the formula (6) shown below, and condensates thereof.

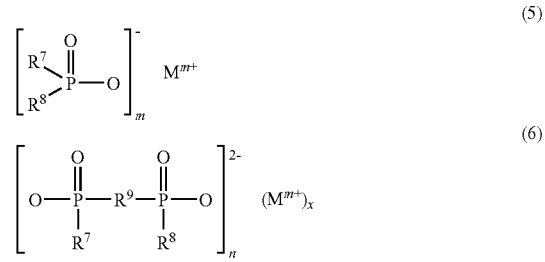

In the formulae, $R^7$ and $R^8$ are each independently a straight chain or branched $C_1$ to $C_6$ alkyl group and/or an aryl group or a phenyl group; $R^9$ is a straight chain or branched $C_1$ to $C_{10}$ alkylene group, a $C_6$ to $C_{10}$ arylene group, a $C_1$ to $C_{10}$ alkyl-$C_6$ to $C_{10}$ arylene group, or a $C_6$ to $C_{10}$ aryl-$C_1$ to $C_{10}$ alkylene group; M is at least one selected from the group consisting of calcium (ion), magnesium (ion), aluminum (ion), zinc (ion), bismuth (ion), manganese (ion), sodium (ion), potassium (ion), and a protonated nitrogen base; and m is 2 or 3, n is an integer of 1 to 3, and x is 1 or 2.

The composition of the phosphinate salts is not limited as long as being in the range of not damaging an advantage of the embodiment. The content of a phosphinate salt represented by the formula (5) is preferably 90% by mass or more, more preferably 95% by mass or more, and still more preferably 98% by mass or more, based on 100% by mass of the phosphinate salts, from the viewpoint of the flame retardancy and the suppression of mold deposit of a thermoplastic resin composition.

The phosphinic acids may include, for example, dimethylphosphinic acid, ethylmethylphosphinic acid, diethylphosphinic acid, methyl-n-propylphosphinic acid, methane di(methylphosphinic acid), benzene-1,4-(dimethylphosphinic acid), methylphenylphosphinic acid, diphenylphosphinic acid, and mixtures thereof.

The metal component may include calcium ions, magnesium ions, aluminum ions, zinc ions, bismuth ions, manganese ions, sodium ions, potassium ions, and protonated nitrogen bases. These may be used singly or in two or more. More preferably, the metal component is one or more selected from the group consisting of calcium ions, magnesium ions, aluminum ions, and zinc ions.

The phosphinate salts may include, for example, calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methane di(methylphosphinate), magnesium methane di(methylphosphinate), aluminum methane di(methylphosphinate), zinc methane di(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate.

From the viewpoint of the flame retardancy and the suppression of mold deposit of a thermoplastic resin composition, the phosphinates are preferably calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, and zinc diethylphosphinate, and among them, aluminum diethylphosphinate is more preferable.

In consideration of the mechanical strength and appearance of a molded product obtained by molding the thermoplastic resin composition according to the embodiment, the preferable lower limit value of the average particle diameter of the phosphinate salts is 0.01 μm. The more preferable lower limit value is 0.5 μm and the still more preferable one is 1 μm. The preferable upper limit value of the average particle diameter of the phosphinate salts is 50 μm; the more preferable one is 20 μm; the still more preferable one is 15 μm; and the further still more preferable one is 10 μm.

Making the average particle diameter of the phosphinate salts to be 0.01 μm or more can improve the handleability and the biting property into an extruder or the like in processes including melting and kneading.

Making the average particle diameter to be 20 μm or less can easily develop the mechanical strength of a thermoplastic resin composition and can improve the surface appearance of a molded product.

In the embodiment, the average particle diameter of phosphinate salts can be measured and analyzed by dispersing the phosphinate salts in methanol using a laser diffraction particle size distribution analyzer (for example, trade name: SALD-2000, manufactured by Shimadzu Corp.).

The dispersion method of phosphinate salts in methanol may include a method in which methanol and phosphinate salts are added to an ultrasonic diffuser and/or a stirring tank equipped with a stirrer. A dispersion liquid thus obtained is sent to a measurement cell of a laser diffraction particle size distribution analyzer through a pump, and measured for the particle diameter by laser diffraction. The number-average particle diameter can be calculated from the frequency distribution based on the particle diameters and the number of the particles obtained by the measurement.

In the phosphinate salts in the embodiment, unreacted products and by-products may remain as long as not damaging an advantage of the embodiment.

The blend amount of a phosphorus flame retardant is preferably 0.1 part by mass or more based on 100 parts by mass of the total of (A), (B) and (C) from the viewpoint of the flame retardancy of a thermoplastic resin composition. The content is preferably a proportion of 40 parts by mass or less from the viewpoint of the heat resistance of the thermoplastic resin composition. The content is more preferably from 1 to 20 parts by mass, and still more preferably from 3 to 10 parts by mass.

The thermoplastic resin composition according to the embodiment may further comprise an inorganic reinforcing filler.

The inorganic reinforcing filler may include, for example, glass fibers, carbon fibers, wollastonite, talc, kaolin, clay, titanium oxide, potassium titanate, calcium carbonate, glass flake and the like. One kind of these may be used or a mixture of two or more may be use. In the case of using a mixture of two or more thereof, a mixture of a fibrous filler and a non-fibrous filler is preferable from the viewpoint that warping of injection molded products become small, and otherwise. More preferable fillers are glass fibers, carbon fibers, wollastonite, talc, clay and titanium oxide, and still more preferable fillers are glass fibers, carbon fibers, wollastonite, talc and titanium oxide.

To the thermoplastic resin composition according to the embodiment, additive components other than the above-mentioned components may be added according to needs in the range of not damaging an advantage of the embodiment.

The additive component may include, for example, conductivity imparting materials (conductive carbon black, carbon nanotube, and the like), plasticizers (oils, low molecular-weight polyolefin, polyethylene glycol, fatty acid esters, and the like), antistatic agents, various types of peroxides, zinc oxide, zinc sulfide, antioxidants, ultraviolet absorbents, light stabilizers and colorants.

(A Method for Manufacturing a Thermoplastic Resin Composition)

A processing machine to obtain the thermoplastic resin composition according to the embodiment may include, for example, a single-screw extruder, a twin-screw extruder, a roll, a kneader, a Brabender Plastograph, a Banbury mixer and the like. Among them, a twin-screw extruder is preferable.

A manufacturing method using a twin-screw extruder is not particularly limited, and may include:

(1) a method in which (A) a polyphenylene ether, (B) an aromatic vinyl-unsaturated dicarboximide copolymer and (C) an aromatic vinyl-cyanided vinyl copolymer are fed from an upstream feed port, and melted and kneaded;

(2) a method in which the (A) is fed from an upstream feed port and the (B) and the (C) are fed from a downstream feed port, and these are melted and kneaded; and (3) a method in which (i) the (B) and the (C) undergoes a process of being previously melted and kneaded to obtain a mixture, and thereafter, (ii) the (A) and the mixture obtained in (i) are fed from an upstream feed port, and melted and kneaded. The process of (i) may use a single-screw extruder.

In the embodiment, also in the case of blending (D) an elastomer and additives as components other than (A), (B) and (C), these may be added from an upstream feed port, or from a downstream feed port.

In the embodiment, in the case of blending (E) a flame retardant and/or an inorganic filler such as glass fibers and talc, the manufacturing method may include:

(1) a method in which (E) a flame retardant and/or an inorganic filler in addition to (A), (B) and (C) are fed from an upstream feed port, and melted and kneaded;

(2) a method in which the (A), the (B) and the (C) are fed from an upstream feed port and (E) the flame retardant and/or the inorganic filler are fed from a downstream feed port, and these are melted and kneaded;

(3) a method using an extruder equipped with an upstream feed port and two feed ports on the downstream side, in which the (A), the (B) and the (C) are fed from an upstream feed port, and (E) the flame retardant is fed from a downstream first feed port, and the inorganic filler is fed from a downstream second feed port, and these are melted and kneaded;

(4) a method in which the (A) is fed from an upstream feed port, and the (B) and the (C) are fed from a downstream first feed port and (E) the flame retardant and/or the inorganic filler is fed from a downstream second feed port, and these are melted and kneaded; and (5) a method using a composition fabricated by adding no inorganic filler, in which the composition is fed from an upstream feed port and the inorganic filler is fed from a downstream feed port, and these are melted and kneaded.

In the case where (E) a flame retardant is a liquid at 0 to 120° C., it can be added using a liquid feed apparatus. In the case where (E) the flame retardant is added using the liquid feed apparatus, the addition may be carried out in the state that (A), (B) and (C) are melted, or before these are melted.

(A Molded Product)

The thermoplastic resin composition according to the embodiment can be molded into molded products for various parts by various types of conventional well-known methods such as injection molding.

The various parts may include, for example, internal parts of hard disks used in digital household appliance products such as personal computers, hard disk drives, DVD recorders, digital camcorders, portable digital music players and cellular phones, internal parts of various types of computers and peripheral equipment thereof, IC tray materials, electric and electronic parts such as chassis and cabinets for various types of disk players, electric parts for autobicycles and automobiles represented by relay block materials and the like, heat-resistant parts for automobiles, and heat-resistant parts for business machines. Among them, the molded products are suitably used as internal parts of hard disks, which necessitate precision molding.

The internal parts of hard disks may include, for example, brackets, latches, combs, spoilers, bushes, mount plates, hooks and the like.

The heat resistant parts for automobiles may include, for example, alternator terminals, alternator connectors, IC regulators, potentiometer bases for lightdayers, various types of valves such as exhaust gas valves, engine cooling-water joints, carburetor main bodies, carburetor spacers, exhaust air gas sensors, cooling water sensors, oil temperature sensors, brake pad wear sensors, throttle position sensors, crankshaft position sensors, air flow meters, thermostat bases for air conditioners, heating air flow control valves, brush holders for radiator motors, water pump impellers, turbine vanes, windshield wiper motor-related parts, distributors, starter switches, starter relays, wire harnesses for transmissions, window washer nozzles, air conditioner panel switch boards, coils for fuel-related electromagnetic valves, connectors for fuses, horn terminals, insulating plates for electric parts, stepping motor rotors, brake pistons, solenoid bobbins, parts such as ignition device cases, hub caps, lamp sockets, lamp housings, lamp extensions, and lamp reflectors.

The heat resistant parts for business machines may include, for example, household and business electric product parts such as air conditioner parts, typewriter parts and word processor parts, office computer-related parts, phone-related parts, facsimile-related parts, and copying machine-related parts.

(A Sheet)

The thermoplastic resin composition according to the embodiment is suitably made into sheets. The sheets used here refer to ones having a thickness of from 0.001 to 2.0 mm, preferably from 0.005 to 0.50 mm, and more preferably from 0.005 to 0.20 mm. The sheets may be called films in some cases.

A sheet may be obtained by using the thermoplastic resin composition according to the embodiment as a raw material and subjecting the composition to sheet extrusion. A sheet also may be obtained by directly charging each component of the thermoplastic resin composition according to the embodiment in a sheet extrusion machine to simultaneously carry out blending and sheet extrusion.

A method for manufacturing a sheet is not particularly limited, and may include, for example, an extrusion tubular method, and a method called the inflation method in some cases. It is very important in order to uniformize the sheet thickness and fabricate a sheet exhibiting no layer exfoliation that a parison is controlled at a temperature suitably selected from the temperature range of from 50 to 290° C. such that the parison is not cooled immediately after the parison is put out from a cylinder.

A sheet can be manufactured also by the T-die extrusion. In this case, the sheet may be used with no drawing, or may be obtained by uniaxial drawing or biaxial drawing. The case where the strength of a sheet is intended to be enhanced can be achieved by drawing.

Since a sheet obtained from the thermoplastic resin composition according to the embodiment is excellent in heat resistance and has an excellent appearance, the sheet can suitably be used for applications including, for example, printed circuit board materials, printed circuit board peripheral parts, separating films for printed circuit board production, semiconductor packages, magnetic tapes for data, APS photographic films, film capacitors, insulating materials for motors and transformers, speaker diaphragms, sheet sensors for automobiles, insulating tapes for wire cables, TAB tapes, generator slot liner interlayer insulating materials, toner agitators, and insulating washers for lithium ion batteries and the like.

EXAMPLES

Hereinafter, the embodiment will be described in detail by way of Examples, but the embodiment should not be construed to be limited to these Examples.

(The Raw Materials Used)

(1) (A) Polyphenylene Ethers (Hereinafter, Abbreviated to "PPE")

[PPE-1]

20.6 g of cupric oxide, 155.0 g of a 47% hydrogen bromide aqueous solution, 49.7 g of di-t-butylethylenediamine, 240.4 g of di-n-butylamine, 731.7 g of butyldimethylamine, 300 kg of toluene, and 16.0 kg of 2,6-dimethylphenol were placed in a 500-L polymerization tank with a jacket equipped with a sparger to introduce an oxygen-containing gas, a stirring turbine blade and a baffle on the bottom of the polymerization tank and with a reflux cooler on a vent gas line in the upper section of the polymerization tank, and stirred until the mixture turned to a homogeneous solution and the internal temperature of the reactor became 25° C. while nitrogen gas was being blown in at a flow rate of 2.5 L/min.

Then, introduction of oxygen gas to the stirred polymerization tank at a rate of 10 NL/min by the sparger was started to initiate the polymerization. The oxygen gas was introduced for 320 minutes and the temperature was controlled to be gradually raised such that the internal temperature at the termination of the polymerization became 40° C. The polymerization liquid at the termination of the polymerization was in a solution state.

The introduction of oxygen-containing gas was stopped and 10 kg of a 2.5% aqueous solution of tetrasodium ethylenediaminetetraacetate (manufactured by Dojindo Laboratories) was added to the polymerization mixture, and stirred until the temperature reached 70° C. Thereafter, the mixture was stirred continuously for 100 minutes, and then allowed to stand, and separated into an organic phase and a water phase by the liquid-liquid separation. An excessive amount of methanol was added to the obtained organic phase; and a deposited poly(2,6-dimethyl-1,4-phenylene ether) was filtered out, and repeatedly washed with methanol and dried to obtain PPE-1.

The reduced viscosity of PPE-1 (chloroform solution of 0.5 g/dL, measured at 30° C.) was 0.52 dL/g.

[PPE-2]

PPE-2 was obtained as in PPE-1, but with the polymerization reaction time varied. The reduced viscosity (chloroform solution of 0.5 g/dL, measured at 30° C.) was 0.41 dL/g.

(2) (B) Aromatic Vinyl-Unsaturated Carboximide Copolymers (Hereinafter, Abbreviated to "S-PMI")

[S-PMI-1]

S-PMI-1, which is a styrene/N-phenylmaleimide/maleic anhydride copolymer, was manufactured referring to a manufacturing method described in an example in Japanese Patent Application Laid-Open Publication No. 2005-298776. The mass ratio of each component in the copolymer was calculated from $^1$H-NMR, $^{13}$C-NMR and the element analysis.

Styrene/N-phenylmaleimide/maleic anhydride=48/51/1 (mass ratio of polymer components)

The weight-average molecular weight: 150,000

The glass transition temperature (DSC method): 202° C.

[S-PMI-2]

S-PMI-2, which is a styrene/N-phenylmaleimide/maleic anhydride copolymer, was manufactured referring to a manufacturing method described in an example in Japanese Patent Application Laid-Open Publication No. 11-158215.

Styrene/N-phenylmaleimide/maleic anhydride=50/49/1 (mass ratio of polymer components)

The weight-average molecular weight: 133,000

The glass transition temperature (DSC method): 203° C.

[S-PMI-3]

S-PMI-3, which is a styrene/N-phenylmaleimide/acrylonitrile copolymer, was manufactured referring to a manufacturing method described in an example in Japanese Patent Application Laid-Open Publication No. 11-158215.

Styrene/N-phenylmaleimide/acrylnitrile=50/40/10 (mass ratio of polymer components)

The weight-average molecular weight: 151,000

The glass transition temperature (DSC method): 169° C.

[S-PMI-4]

S-PMI-4, which is a styrene/N-phenylmaleimide/acrylonitrile copolymer, was manufactured referring to a manufacturing method described in an example in WO 99/60040.

Styrene/N-phenylmaleimide/acrylonitrile=50/33/17 (mass ratio of polymer components)

The weight-average molecular weight: 149,000

The glass transition temperature (DSC method): 150° C.

[S-PMI-5]

S-PMI-5, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=50/49/1 (mass ratio of polymer components)

The weight-average molecular weight: 70,000

The glass transition temperature (DSC method): 201° C.

[S-PMI-6]

S-PMI-6, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=50/49/1 (mass ratio of polymer components)

The weight-average molecular weight: 200,000

The glass transition temperature (DSC method): 202° C.

[S-PMI-7]

S-PMI-7, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=50/49/1 (mass ratio of polymer components)

The weight-average molecular weight: 50,000

The glass transition temperature (DSC method): 201° C.

[S-PMI-8]

S-PMI-8, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=50/49/1 (mass ratio of polymer components)

The weight-average molecular weight: 300,000

The glass transition temperature (DSC method): 203° C.

[S-PMI-9]

S-PMI-9, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=35/64/1 (mass ratio of polymer components)

The weight-average molecular weight: 150,000

The glass transition temperature (DSC method): 214° C.

[S-PMI-10]

S-PMI-10, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=65/34/1 (mass ratio of polymer components)

The weight-average molecular weight: 150,000

The glass transition temperature (DSC method): 165° C.

[S-PMI-11]

S-PMI-11, which is a styrene/N-phenylmaleimide/maleic anhydride copolymer, was manufactured referring to a manufacturing method described in an example in Japanese Patent Application Laid-Open Publication No. 2005-298776.

Styrene/N-phenylmaleimide/maleic anhydride=80/19/1 (mass ratio of polymer components)

The weight-average molecular weight: 150,000

(3) (C) Aromatic Vinyl-Cyanided Vinyl Copolymers (Hereinafter, Abbreviated to "AS")

AS-1 to AS-4, which are styrene/acrylonitrile copolymers, were manufactured referring to manufacturing methods described in examples in Japanese Patent Application Laid-Open Publication No. 2005-298776. The mass ratio of each component of the copolymers was calculated from $^1$H-NMR, $^{13}$C-NMR and the element analysis.

[AS-1]

Styrene/acrylonitrile=75/25 (mass ratio of polymer components)

The weight-average molecular weight: 134,000

[AS-2]

Styrene/acrylonitrile=70/30 (mass ratio of polymer components)

The weight-average molecular weight: 132,000

[AS-3]

Styrene/acrylonitrile=65/35 (mass ratio of polymer components)

The weight-average molecular weight: 120,000

[AS-4]

Styrene/acrylonitrile=60/40 (mass ratio of polymer components)

The weight-average molecular weight: 122,000

(4) A Polystyrene (Hereinafter, Abbreviated to "PS")

Trade name: PSJ Polystyrene 685 (manufactured by PS Japan Corporation.)

(5) Elastomers (D-1) Trade name: Kraton G1651E (registered trademark) (manufactured by Kraton Polymers) (hereinafter, abbreviated to "SEBS")

A hydrogenated styrene-butadiene-styrene copolymer (D-2) Trade name: Metablen SRK-200 (registered trademark) (manufactured by Mitsubishi Rayon Co., Ltd.) (hereinafter, abbreviated to "Si-g-AS")

A composite rubber-based graft copolymer obtained by graft polymerizing styrene and acrylonitrile to a polydimethylsiloxane rubber component and a poly(n-butyl acrylate) rubber component (6) Flame Retardants Aluminum diethylphosphinate (hereinafter, abbreviated to "DEP") was manufactured referring to a manufacturing method described in an example in Japanese Patent Application Laid-Open Publication No. 2005-179362. Lumps of DEP were wet pulverized in water, and thereafter classified to obtain DEP having an average particle diameter described below. The average particle diameter was measured by using a laser diffraction particle size distribution analyzer (trade name: SALD-2000, manufactured by Shimadzu CORPORATION) and dispersing phosphinate salts in methanol.

[DEP-1] Aluminum diethylphosphinate

The average particle diameter=3.1 μm

[DEP-2] Aluminum diethylphosphinate

The average particle diameter=38 μm (Evaluation Methods)

Hereinafter, the evaluation methods will be described.

<Vicat Softening Temperature (VST)>

The thermoplastic resin compositions pellets obtained in Examples and Comparative Examples were dried for 3 hours using a drier at 100° C., and molded into molded pieces of the multi-purpose test piece A type according to ISO 3167, using an injection molding machine (IS-80EPN, manufactured by Toshiba Machine Co., Ltd.) set at an injection rate of 200 mm/sec, a hold pressure of 70 MPa, a time of injection and pressure holding of 20 seconds, a cooling time of 20 seconds, a die temperature of 120° C., and a melt resin temperature of 330° C. The obtained molded pieces were cut and used for measurement of Vicat softening temperature by the A120 method according to ISO 306.

<Deflection Temperature Under Load (DTUL)>

The thermoplastic resin compositions pellets obtained in Examples and Comparative Examples were dried for 3 hours using a drier at 100° C., and molded into molded pieces of the multi-purpose test piece A type according to ISO 3167, using an injection molding machine (IS-80EPN, manufactured by Toshiba Machine Co., Ltd.) set at an injection rate of 200 mm/sec, a hold pressure of 70 MPa, a time of injection and pressure holding of 20 seconds, a cooling time of 20 seconds, a die temperature of 120° C., and a melt resin temperature of 330° C. The obtained molded pieces were cut into test pieces of 80 mm×10 mm×4 mm, and used for measurement of the deflection temperature under load by the method for flatwise at 1.80 MPa according to ISO 75.

<Flame Retardancy>

The thermoplastic resin compositions pellets obtained in Examples and Comparative Examples were dried for 3 hours using a drier at 100° C., and molded into molded pieces of 127 mm×13 mm×1.6 mm, using an injection molding machine (IS-80EPN, manufactured by Toshiba Machine Co., Ltd.) set at an injection rate of 700 mm/sec, a hold pressure of 70 MPa, a time of injection and pressure holding of 10 seconds, a cooling time of 15 seconds, a die temperature of 120° C., and a melt resin temperature of 330° C. Five test pieces of the obtained test pieces were each brought into contact with a flame two times, and measured for burning times of ten times in total based on UL-94 (The Underwriters Laboratories Standards in the U.S.), and evaluated for the average burning time and the maximum burning time.

<Fluidity>

The thermoplastic resin compositions pellets obtained in Examples and Comparative Examples were dried for 3 hours using a drier at 100° C., and measured for MFR at 310° C. at a load of 10 kg according to ISO 1133.

<Transparency>

The thermoplastic resin compositions pellets obtained in Examples and Comparative Examples were dried for 3 hours using a drier at 100° C., and molded into molded pieces of the multi-purpose test piece A type according to ISO 3167, using an injection molding machine (IS-80EPN, manufactured by Toshiba Machine Co., Ltd.) set at an injection rate of 200 mm/sec, a hold pressure of 70 MPa, a time of injection and pressure holding of 20 seconds, a cooling time of 20 seconds, a die temperature of 120° C., and a melt resin temperature of 330° C. The obtained molded pieces (4 mm thick) were measured for the whole light transmittance and the haze using a turbidimeter (NDH2000, manufactured by Nippon Denshoku Industries Co., Ltd.). Five molded pieces were measured and the average was defined as a measurement value.

<Outgas>

The thermoplastic resin compositions pellets obtained in Examples and Comparative Examples were dried for 3 hours using a drier at 100° C., and thereafter heated at 150° C. for 1 hour to generate gas; and the generated gas components were analyzed using GC-MS (HP6890, HP5973, manufactured by Hewlett-Packard Development Corp.), and the total amount of the generated gas components was defined as an outgas.

<Impact Resistance>

The thermoplastic resin compositions pellets obtained in Examples and Comparative Examples were dried for 3 hours using a drier at 100° C., and molded into molded pieces of the multi-purpose test piece A type according to ISO 3167, using an injection molding machine (IS-80EPN, manufactured by Toshiba Machine Co., Ltd.) set at an injection rate of 200 mm/sec, a hold pressure of 70 MPa, a time of injection and pressure holding of 20 seconds, a cooling time of 20 seconds, a die temperature of 120° C., and a melt resin temperature of 330° C. The obtained molded pieces were measured for the Charpy impact strength (CHARPY) at 23° C. at 50 RH % according to ISO 179. Five molded pieces were measured and the average was defined as a measurement value.

<Determination of Puncture Impact Strength Characteristic>

The resin compositions pellets obtained in Examples and Comparative Examples were dried for 3 hours using a drier at 100° C., and molded into molded flat plate pieces of 90 mm×50 mm×2.5 mm, using an injection molding machine (IS-80EPN, manufactured by Toshiba Machine Co., Ltd.) set at an injection rate of 200 mm/sec, a hold pressure of 40 MPa, a time of injection and pressure holding of 10 seconds, a cooling time of 15 seconds, a die temperature of 120° C., and a melt resin temperature of 330° C. The obtained test pieces were subjected to an impact test, using a drop weight graphic impact tester (manufactured by Toyo Seiki Seisaku-sho, Ltd.), under the conditions of 23° C. and 50 RH %, and using a holder having a diameter φ of 40 mm, a striker having a diameter of 12.7 mm and a weight of 6.5 kg and the striker from a height of 100 cm, to measure the total absorption energy. Ten pieces of test pieces were used for the measurement and the average was defined as a measurement value.

<Extrusion Productivity>

When the thermoplastic resin compositions in Examples and Comparative Examples were fabricated, whether strands were stably or not stably extruded from a die of a twin-screw extruder was observed; and the case where the strand was stably extruded was defined as "○" and the case where die swelling occurred and a phenomenon of strand cutting sometimes occurred was defined as "X".

<Glass Transition Temperature (DSC Method)>

The measurement was carried out in a nitrogen gas flow at a rising temperature rate of 20° C./min using a differential scanning calorimetric analyzer (DSC7, manufactured by Perkin Elmer Inc.) according to JIS K-7121. The midpoint glass transition temperature ($T_{mg}$) was defined as a glass transition temperature.

<Glass Transition Temperature (Viscoelastic Method)>

The thermoplastic resin compositions pellets obtained in Examples and Comparative Examples were dried for 3 hours using a drier at 100° C., and molded into molded pieces of 127 mm×13 mm×1.6 mm, using an injection molding machine (IS-80EPN, manufactured by Toshiba Machine Co., Ltd.) set at an injection rate of 700 mm/sec, a hold pressure of 70 MPa, a time of injection and pressure holding of 10 seconds, a cooling time of 15 seconds, a die temperature of 120° C., and a melt resin temperature of 330° C. The obtained test pieces were measured at 10 Hz, at a strain of 0.1% and at a rising temperature rate of 3° C./min from 30° C. to 250° C., using a viscoelasticity analyzer (RDA-II, manufactured by Rheometrix Corp.); and the peak temperature of tan δ on the lower temperature side was defined as a glass transition temperature of a mixture of the (B) component and the (C) component.

Examples 1 to 6, and Comparative Examples 1 to 3

The Case where the A Component and the B Component are Contained

Thermoplastic resin compositions pellets were provided by using a twin-screw extruder (ZSK-26MC, manufactured by Coperion Corp. (Germany)), which had an upstream feed port on the first barrel from the extruder upstream side, and an L/D (the cylinder length/the cylinder diameter of the extruder) of 48 (the number of barrels: 12), feeding resin components of raw materials from the upstream feed port so that the proportions (parts by mass) thereof were as described in Table 1, and melting and kneading the fed resin components under the extruder conditions set at the temperature from the upstream feed port to a die of 290° C., at a screw rotation frequency of 300 rpm and at a delivery amount of 15 kg/h. At this time, volatile contents were removed from a vacuum vent installed on the tenth barrel to obtain the thermoplastic resin compositions. The evaluation results of the Vicat softening temperature, deflection temperature under load, flame retardancy, outgas, impact resistance, fluidity, and pellet productivity of the obtained thermoplastic resin compositions are shown in Table 1 together with the compositions.

TABLE 1

| Resin Components (parts by mass) | Comonomer Ratio | | | | Molecular Weight | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|---|---|---|
| | St | PMI | AN | MAH | | | | | | | | | | |
| (1) PPE-1 | | | | | | 90 | 90 | 90 | 90 | 90 | 90 | 100 | 90 | 90 |
| (2) S-PMI-1 | 48 | 51 | 0 | 1 | Mw = 150,000 | 10 | | | | | | | | |
| S-PMI-2 | 50 | 49 | 0 | 1 | Mw = 133,000 | | | | | | | | | |
| S-PMI-3 | 50 | 40 | 10 | 0 | Mw = 151,000 | | | | | | | | | |
| S-PMI-4 | 50 | 33 | 17 | 0 | Mw = 149,000 | | | | | | | | | |
| S-PMI-5 | 50 | 49 | 0 | 1 | Mw = 70,000 | | 10 | | | | | | | |
| S-PMI-6 | 50 | 49 | 0 | 1 | Mw = 200,000 | | | 10 | | | | | | |
| S-PMI-7 | 50 | 49 | 0 | 1 | Mw = 50,000 | | | | | | | | 10 | |
| S-PMI-8 | 50 | 49 | 0 | 1 | Mw = 300,000 | | | | | | | | | 10 |
| S-PMI-9 | 35 | 64 | 0 | 1 | Mw = 150,000 | | | | 10 | | | | | |
| S-PMI-10 | 65 | 34 | 0 | 1 | Mw = 150,000 | | | | | 10 | | | | |
| S-PMI-11 | 80 | 19 | 0 | 1 | Mw = 150,000 | | | | | | 10 | | | |
| Glass Transition Temperature (DSC Method) of (B) Component | °C. | | | | | 202 | 201 | 202 | 214 | 165 | 140 | — | 201 | 203 |
| VST | °C. | | | | | 215 | 213 | 215 | 214 | 212 | 205 | 215 | 211 | 214 |
| DTUL | °C. | | | | | 184 | 180 | 182 | 183 | 180 | 170 | 185 | 179 | 182 |
| Average Burning Time | sec | | | | | 7 | 9 | 7 | 12 | 10 | 14 | 7 | 13 | 12 |
| Maximum Burning Time | sec | | | | | 12 | 15 | 12 | 21 | 17 | 29 | 13 | 25 | 19 |
| Outgas | ppm | | | | | 15 | 60 | 14 | 34 | 46 | 41 | 14 | 104 | 14 |
| CHARPY | kJ/m$^2$ | | | | | 5.8 | 5.7 | 5.0 | 1.5 | 5.0 | 2.8 | 3.4 | 4.6 | 2.2 |
| MFR | g/10 min | | | | | 10 | 11 | 10 | 12 | 10 | 12 | 4 | 12 | 5 |
| Extrusion Productivity | (die swelling) | | | | | ○ | ○ | ○ | X | ○ | ○ | ○ | ○ | X |

As shown in Table 1, any of Examples 1 to 6 exhibited an outgas of 60 ppm or lower and an MFR of 10 g/10 min or higher. By contrast, Comparative Example 1 exhibited an outgas of 14 ppm, but an MFR of 4 g/10 min. Comparative Example 2 exhibited an MFR of 12 g/10 min, but an outgas of 104 ppm. Comparative Example 3 exhibited an outgas of 14 ppm, but an MFR of 5 g/10 min.

From the above, it was revealed that Examples 1 to 6 were excellent in the outgassing, and also excellent in the fluidity.

Further, Examples 1, 2, 3, 5 and 6 were good in the pellet productivity. Further, Examples 1, 2, 3 and 5 exhibited a Charpy impact strength of 5.0 kJ/m$^2$ or higher.

Examples 1 to 3 exhibited an average burning time of 10 seconds or less and also exhibited a maximum burning time of 15 seconds or less. By contrast, Comparative Examples 2 and 3 had an average burning time of 12 seconds or more and also had a maximum burning time of 19 seconds or more. From these comparisons, it was revealed that making the molecular weight of the (B) component in a specific range gave an excellent flame retardancy.

Examples 7 to 12, and Comparative Example 4

The Case where the (A) Component and the (B) Component are Contained

Thermoplastic resin compositions pellets were provided as in Example 1, except for adopting the proportions (parts by mass) described in Table 2. The evaluation results of the Vicat softening temperature, deflection temperature under load, flame retardancy, outgas, impact resistance, fluidity, transparency, and pellet productivity of the obtained thermoplastic resin compositions are shown in Table 2 together with the compositions.

TABLE 2

| Resin Components (parts by mass) | Comonomer Ratio | | | | Molecular Weight | Example 1 | Example 7 | Example 8 | Example 9 | Example 10 | Example 11 | Example 12 | Comparative Example 4 |
|---|---|---|---|---|---|---|---|---|---|---|---|---|---|
| | St | PMI | AN | MAH | | | | | | | | | |
| (1) PPE-1 | | | | | | 90 | 90 | 90 | 90 | 95 | 80 | | 65 |
| PPE-2 | | | | | | | | | | | | 90 | |
| (2) S-PMI-1 | 48 | 51 | 0 | 1 | Mw = 150,000 | 10 | | | | 5 | 20 | 10 | 35 |
| S-PMI-2 | 50 | 49 | 0 | 1 | Mw = 133,000 | | 10 | | | | | | |
| S-PMI-3 | 50 | 40 | 10 | 0 | Mw = 151,000 | | | 10 | | | | | |
| S-PMI-4 | 50 | 33 | 17 | 0 | Mw = 149,000 | | | | 10 | | | | |
| Glass Transition Temperature (DSC Method) of (B) Component | °C. | | | | | 202 | 203 | 169 | 150 | 202 | 202 | 202 | 202 |
| VST | °C. | | | | | 215 | 215 | 214 | 213 | 215 | 212 | 213 | 212 |
| DTUL | °C | | | | | 184 | 184 | 180 | 181 | 184 | 181 | 183 | 180 |

TABLE 2-continued

| Resin Components (parts by mass) | Comonomer Ratio | | | | Molecular Weight | Example 1 | Example 7 | Example 8 | Example 9 | Example 10 | Example 11 | Example 12 | Comparative Example 4 |
|---|---|---|---|---|---|---|---|---|---|---|---|---|---|
| | St | PMI | AN | MAH | | | | | | | | | |
| Average Burning Time | sec | | | | | 7 | 7 | 5 | 6 | 7 | 9 | 9 | 12 |
| Maximum Burning Time | sec | | | | | 12 | 11 | 12 | 10 | 12 | 15 | 16 | 21 |
| Outgas | ppm | | | | | 15 | 42 | 30 | 34 | 14 | 22 | 44 | 47 |
| CHARPY | kJ/m² | | | | | 5.8 | 5.8 | 5.2 | 5.6 | 4.2 | 5.5 | 4.1 | 2.1 |
| MFR | g/10 min | | | | | 10 | 10 | 13 | 15 | 8 | 12 | 35 | 14 |
| Whole Light Transmittance | % | | | | | 29 | 30.6 | 44.8 | 58.5 | 32.5 | 28.4 | 27.9 | 19.5 |
| Haze | % | | | | | 74.8 | 73.0 | 62.2 | 24.5 | 68.7 | 76.6 | 78.6 | 84.5 |
| Extrusion roductivity | (die swelling) | | | | | ○ | ○ | ○ | ○ | ○ | ○ | ○ | X |

As shown in Table 2, any of Examples 7 to 12 exhibited an outgas of 44 ppm or lower and an MFR of 8 g/10 min or higher. By contrast, Comparative Example 4 containing 65 parts by mass of PPE-1 and 35 parts by mass of S-PMI-1 exhibited an outgas of 47 ppm and an MFR of 14 g/10 min.

From the above, it was revealed that Examples 7 to 12 were excellent in the outgassing and also excellent in the fluidity.

Further, Examples 1 and 7 to 12 had a Charpy impact strength of 4.1 to 5.8 kJ/m², and the pellet productivity was "○".

Further, Examples 8 and 9 exhibited a whole light transmittance of 44.8% and 58.5%, which revealed an excellent transparency also.

Examples 13 to 19, and Comparative Examples 5 and 6

The Case where the (A) Component, the (B) Component and the (C) Component are Contained Thermoplastic resin compositions pellets were provided as in Example 1, except for adopting the proportions (parts by mass) described in Table 3. The evaluation results of the Vicat softening temperature, deflection temperature under load, flame retardancy, outgas, impact resistance, fluidity, and transparency of the obtained thermoplastic resin compositions are shown in Table 3 together with the results of Examples 1 and 6 and Comparative Example 1.

TABLE 3

| Resin Components (parts by mass) | Comonomer Ratio | | | | | Molecular Weight | Example 1 | Example 6 | Example 13 | Example 14 | Example 15 | Example 16 | Example 17 |
|---|---|---|---|---|---|---|---|---|---|---|---|---|---|
| | St | PMI | AN | MAH | Ts | | | | | | | | |
| (1) PPE-1 | | | | | | | 90 | 90 | 90 | 90 | 90 | 90 | 90 |
| PPE-2 | | | | | | | | | | | | | |
| (2) S-PMI-1 | 48 | 51 | 0 | 1 | 202 | Mw = 160,000 | 10 | | 8 | 6 | 4 | 3 | 6 |
| S-PMI-11 | 80 | 19 | 0 | 1 | 140 | Mw = 150,000 | | 10 | | | | | |
| (3) AS-1 | 75 | 0 | 25 | 0 | | Mw = 134,000 | | | | | | | 4 |
| AS-2 | 70 | 0 | 30 | 0 | | Mw = 132,000 | | | | | | | |
| AS-3 | 65 | 0 | 35 | 0 | | Mw = 120,000 | | | 2 | 4 | 6 | 7 | |
| AS-4 | 60 | 0 | 40 | 0 | | Mw = 122,000 | | | | | | | |
| (4) PS | | | | | | | | | | | | | |
| *1 Styrene | | | | | | | 48 | 80 | 51 | 55 | 58 | 60 | 59 |
| N-phenylmaleimide | | | | | | | 51 | 19 | 41 | 31 | 20 | 15 | 31 |
| Acrylonitrile | | | | | | | 0 | 0 | 7 | 14 | 21 | 25 | 10 |
| Maleic anhydride | | | | | | | 1 | 1 | 1 | 1 | 0 | 0 | 1 |
| Glass Transition Temperature (Viscoelastic Method) of Mixture of (B) Component and (C) Component | °C. | | | | | | — | — | 183 | 161 | 141 | 132 | 166 |
| VST | °C. | | | | | | 215 | 205 | 214 | 214 | 213 | 213 | 213 |
| DTUL | °C. | | | | | | 184 | 168 | 182 | 181 | 180 | 179 | 180 |
| Average Burning Time | sec | | | | | | 7 | 14 | 7 | 7 | 5 | 6 | 10 |
| Maximum Burning Time | sec | | | | | | 12 | 29 | 15 | 13 | 9 | 11 | 21 |
| Outgas | ppm | | | | | | 15 | 41 | 31 | 34 | 28 | 33 | 34 |
| CHARPY | kJ/m² | | | | | | 5.8 | 2.8 | 6.5 | 6.5 | 6.1 | 6.0 | 6.3 |
| MFR | g/10 min | | | | | | 10 | 12 | 12 | 14 | 17 | 17 | 15 |
| Whole Light Transmittance | % | | | | | | 29.0 | 51.0 | 40.8 | 53.6 | 60.2 | 59.8 | 52.4 |
| Haze | % | | | | | | 74.8 | 48.4 | 51.3 | 25.7 | 8.7 | 18.7 | 31.2 |

| Resin Components (parts by mass) | Comonomer Ratio | | | | | Molecular Weight | Example 18 | Example 19 | Comparative Example 1 | Comparative Example 2 | Comparative Example 3 |
|---|---|---|---|---|---|---|---|---|---|---|---|
| | St | PMI | AN | MAH | Ts | | | | | | |
| (1) PPE-1 | | | | | | | 90 | 90 | 100 | 90 | 90 |
| PPE-2 | | | | | | | | | | | |

TABLE 3-continued

| | | | | | | | | | | | |
|---|---|---|---|---|---|---|---|---|---|---|---|
| (2) | S-PMI-1 | 48 | 51 | 0 | 1 | 202 | Mw = 160,000 | 6 | 6 | | |
| | S-PMI-11 | 80 | 19 | 0 | 1 | 140 | Mw = 150,000 | | | | |
| (3) | AS-1 | 75 | 0 | 25 | 0 | | Mw = 134,000 | | | | |
| | AS-2 | 70 | 0 | 30 | 0 | | Mw = 132,000 | 4 | | | |
| | AS-3 | 65 | 0 | 35 | 0 | | Mw = 120,000 | | | 10 | |
| | AS-4 | 60 | 0 | 40 | 0 | | Mw = 122,000 | | 4 | | |
| (4) | PS | | | | | | | | | | 10 |
| *1 | Styrene | | | | | | | 57 | 53 | — | 65 | — |
| | N-phenylmaleimide | | | | | | | 31 | 31 | — | 0 | — |
| | Acrylonitrile | | | | | | | 12 | 16 | — | 35 | — |
| | Maleic anhydride | | | | | | | 1 | 1 | — | 0 | — |
| | Glass Transition Temperature (Viscoelastic Method) of Mixture of (B) Component and (C) Component | °C. | | | | | | 163 | 132 | — | 119 | — |
| | VST | °C. | | | | | | 214 | 214 | 215 | 213 | 200 |
| | DTUL | °C. | | | | | | 181 | 182 | 185 | 179 | 171 |
| | Average Burning Time | sec | | | | | | 8 | 8 | 7 | 14 | 14 |
| | Maximum Burning Time | sec | | | | | | 17 | 15 | 13 | 44 | 32 |
| | Outgas | ppm | | | | | | 38 | 35 | 14 | 142 | 175 |
| | CHARPY | kJ/m² | | | | | | 6.1 | 5.7 | 3.4 | 5.2 | 1.9 |
| | MFR | g/10 min | | | | | | 15 | 15 | 4 | 15 | 13 |
| | Whole Light Transmittance | % | | | | | | 52.7 | 49.8 | 60.0 | 45.2 | 60.5 |
| | Haze | % | | | | | | 28.2 | 26.5 | 2.9 | 86.5 | 3.0 |

*1: each component ratio (% by mass) relative to 100% by mass of the total of (B) component and (C) component As shown in Table 3, any of Examples 13 to 19 exhibited an outgas of 41 ppm or lower, and an MFR of 10 g/10 min or higher. By contrast, Comparative Example 5 exhibited an MFR of 15 g/10 min, but an outgas of 142 ppm. Comparative Example 6 exhibited an MFR of 13 g/10 min, but an outgas of 175 ppm.

Further, Examples 13 to 19 containing the (C) component exhibited a whole light transmittance of 40.9 or higher, which revealed an excellent transparency also.

From the above, Examples 13 to 19 were revealed to be excellent also in the outgassing, fluidity and transparency.

Examples 20 to 24

The Case where the (A) Component, the (B) Component, the (D) Component and the (E) Component are Contained Thermoplastic resin compositions pellets were provided by using a twin-screw extruder (ZSK-26MC, manufactured by Coperion Corp. (Germany)), which had an upstream feed port on the first barrel from the extruder upstream side and a downstream feed port on the eighth barrel, and an L/D (the cylinder length/the cylinder diameter of the extruder) of 48 (the number of barrels: 12), feeding resin components of raw materials excluding a flame retardant from the upstream feed port and the flame retardant component from the downstream feed port so that the proportions (parts by mass) thereof were as described in Table 4, and melting and kneading all the fed resin components under the extruder conditions set at the temperature from the upstream feed port to a die of 290° C., at a screw rotation frequency of 300 rpm and at a delivery amount of 15 kg/h. At this time, volatile contents were removed from a vacuum vent installed on the tenth barrel to obtain the thermoplastic resin compositions. The evaluation results of the Vicat softening temperature, deflection temperature under load, flame retardancy, impact resistance, and puncture impact strength characteristic of the obtained thermoplastic resin compositions are shown in Table 4 together with the compositions.

TABLE 4

| Resin Components (parts by mass) | | Example 20 | Example 21 | Example 22 | Example 23 | Example 24 |
|---|---|---|---|---|---|---|
| (1) | PPE-1 | 90 | 90 | | | |
| | PPE-2 | | | 85 | 85 | 85 |
| (2) | S-PMI-1 | 6 | 6 | 10 | 10 | 10 |
| (5) | SEBS | | 4 | 5 | 5 | 5 |
| | Si-g-AS | 4 | | | | |
| (6) | DEP-1 | | | | 5 | |
| | DEP-2 | | | | | 5 |
| VST | °C. | 213 | 213 | 213 | 213 | 214 |
| DTUL | °C. | 181 | 182 | 181 | 181 | 182 |
| Average Burning Time | sec | 6 | 9 | 20 | 3 | 4 |
| Maximum Burning Time | sec | 16 | 17 | 35 | 8 | 9 |
| CHARPY | kJ/m² | 14.1 | 9.7 | 7.4 | 7.2 | 5.8 |
| Puncture Impact | J | 31 | 26 | 27 | 25 | 3 |

As shown in Table 4, any of Examples 20 to 22 had a puncture impact strength of 26 J or higher, and a Charpy impact strength of 7.4 kJ/m² or higher. Hence, containing the (D) component was revealed to be capable of improving the Charpy impact strength and the puncture impact strength property.

Either of Examples 23 and 24 exhibited an average burning time of 4 seconds or less, and a maximum burning time of 9 seconds or less. Hence, containing the (E) component was revealed to be capable of further improving the flame retardancy. That Example 23 had a puncture impact strength of 25 J, and other results revealed that controlling the particle diameter of the (D) component can also suppress the decrease in the puncture impact strength property.

The present application is based on a Japanese patent application (Japanese Patent Application No. 2007-292237), filed with the Japan Patent Office on Nov. 9, 2007, and a Japanese patent application (Japanese Patent Application No. 2008-198291), filed with the Japan Patent Office on Jul. 31, 2008, the subjects of which are incorporated herein by reference.

INDUSTRIAL APPLICABILITY

The thermoplastic resin composition according to the present invention, and the molded product and the sheet comprising the thermoplastic resin composition can be used in the broad fields including electric and electronic parts, OA parts, vehicular parts and mechanical parts.

The invention claimed is:

1. A thermoplastic resin composition comprising:
   (A) a polyphenylene ether;
   (B) a copolymer comprising an aromatic vinyl compound and an unsaturated dicarboximide derivative as constituent monomers; and
   (C) a copolymer comprising an aromatic vinyl compound and a cyanided vinyl compound as constituent monomers,
   wherein the thermoplastic resin composition contains from 70 to 99% by mass of the (A) component, from 1 to 30% by mass of the (B) component and from 0 to 20% by mass of the (C) component, based on 100% by mass of the total of the (A), (B) and (C) components, and
   wherein the (B) component has a weight-average molecular weight of from 70,000 to 250,000.

2. The thermoplastic resin composition according to claim 1, wherein the (B) component is an aromatic vinyl-maleimide copolymer.

3. The thermoplastic resin composition according to claim 1, wherein the (B) component is a copolymer comprising from 40 to 68% by mass of an aromatic vinyl compound, from 32 to 60% by mass of an unsaturated dicarboximide derivative and from 0 to 20% by mass of a copolymerizable vinyl compound.

4. The thermoplastic resin composition according to claim 3, wherein the copolymerizable vinyl compound is a cyanided vinyl compound.

5. The thermoplastic resin composition according to claim 1, wherein the (B) component and/or the (C) component has a content of a cyanided vinyl compound of from 5 to 30% by mass based on 100% by mass of the total of the (B) component and the (C) component.

6. The thermoplastic resin composition according to claim 1, wherein the (B) component has a glass transition temperature (as measured by DSC method) of 165° C. or higher.

7. The thermoplastic resin composition according to claim 1, wherein a mixture of the (B) component and the (C) component has a glass transition temperature (as measured by viscoelastic method) of 125° C. or higher.

8. The thermoplastic resin composition according to claim 1, further comprising (D) an elastomer.

9. The thermoplastic resin composition according to claim 8, wherein the (D) component is a composite rubber-based graft copolymer obtained by graft polymerizing an aromatic vinyl compound and a cyanided vinyl compound to (D-1) a block copolymer comprising a polymer block containing at least one aromatic vinyl compound as a main component and a polymer block containing at least one conjugated diene compound as a main component, and/or to (D-2) a composite rubber comprising a polyorganosiloxane and a polyalkyl (meth)acrylate.

10. The thermoplastic resin composition according to claim 1, further comprising (E) a flame retardant.

11. The thermoplastic resin composition according to claim 10, wherein the (E) component is a phosphinate salt.

12. The thermoplastic resin composition according to claim 11, wherein the phosphinate salt has an average particle diameter of from 0.01 to 20 μm.

13. A molded product comprising a thermoplastic resin composition according to claim 1.

14. A sheet comprising a thermoplastic resin composition according to claim 1.

15. The thermoplastic resin composition according to claim 2, wherein the (B) component is a copolymer comprising from 40 to 68% by mass of an aromatic vinyl compound, from 32 to 60% by mass of an unsaturated dicarboximide derivative and from 0 to 20% by mass of a copolymerizable vinyl compound.

16. The thermoplastic resin composition according to claim 15, wherein the copolymerizable vinyl compound is a cyanided vinyl compound.

17. The thermoplastic resin composition according to claim 2, wherein the (B) component and/or the (C) component has a content of a cyanided vinyl compound of from 5 to 30% by mass based on 100% by mass of the total of the (B) component and the (C) component.

18. The thermoplastic resin composition according to claim 2, wherein the (B) component has a glass transition temperature (as measured by DSC method) of 165° C. or higher.

19. The thermoplastic resin composition according to claim 2, wherein a mixture of the (B) component and the (C) component has a glass transition temperature (as measured by viscoelastic method) of 125° C. or higher.

20. The thermoplastic resin composition according to claim 2, further comprising (D) an elastomer.

21. The thermoplastic resin composition according to claim 20, wherein the (D) component is a composite rubber-based graft copolymer obtained by graft polymerizing an aromatic vinyl compound and a cyanided vinyl compound to (D-1) a block copolymer comprising a polymer block containing at least one aromatic vinyl compound as a main component and a polymer block containing at least one conjugated diene compound as a main component, and/or to (D-2) a composite rubber comprising a polyorganosiloxane and a polyalkyl(meth)acrylate.

22. The thermoplastic resin composition according to claim 2, further comprising (E) a flame retardant.

23. The thermoplastic resin composition according to claim 22, wherein the (E) component is a phosphinate salt.

24. The thermoplastic resin composition according to claim 23, wherein the phosphinate salt has an average particle diameter of from 0.01 to 20 μm.

25. A molded product comprising a thermoplastic resin composition according to claim 2.

26. A sheet comprising a thermoplastic resin composition according to claim 2.

* * * * *